US012005722B2

(12) United States Patent
Klages et al.

(10) Patent No.: US 12,005,722 B2
(45) Date of Patent: Jun. 11, 2024

(54) TECHNIQUE FOR MARKING A PROLATE OBJECT

(71) Applicant: Phoenix Contact GmbH & Co. KG, Blomberg (DE)

(72) Inventors: Kilian Klages, Detmold (DE); Alexander Hofmann, Hameln (DE); Benjamin Pradel, Lage (DE); Juergen Gretscher, Dornhan (DE); Michael Peter, Lage (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 255 days.

(21) Appl. No.: 17/765,870

(22) PCT Filed: Oct. 6, 2020

(86) PCT No.: PCT/EP2020/077969
§ 371 (c)(1),
(2) Date: Sep. 7, 2022

(87) PCT Pub. No.: WO2021/069423
PCT Pub. Date: Apr. 15, 2021

(65) Prior Publication Data
US 2023/0015628 A1 Jan. 19, 2023

(30) Foreign Application Priority Data
Oct. 9, 2019 (BE) .................................. 2019/5668

(51) Int. Cl.
*B41J 3/407* (2006.01)
*B41J 2/32* (2006.01)

(52) U.S. Cl.
CPC ............ *B41J 3/40731* (2020.08); *B41J 2/32* (2013.01)

(58) Field of Classification Search
CPC ........ B41J 2/32; B41J 3/40731; B41J 3/4075; B41J 3/44; B65C 3/02; B65C 11/0284; H01B 13/344
See application file for complete search history.

(56) References Cited

U.S. PATENT DOCUMENTS 5,425,823 A 6/1995 Woodside, III
7,919,027 B2 * 4/2011 Nordlinder ............ H05K 3/045 174/254

(Continued)

*Primary Examiner* — Anh T Vo
(74) *Attorney, Agent, or Firm* — LEYDIG, VOIT & MAYER, LTD.

(57) ABSTRACT

A printing system includes: a printer for outputting a printed product; and a device for providing a marking arranged or arrangeable in a closed circumferential manner around a prolate object. The device includes a mechanical interface and the printer includes a mechanical interface, which are positively and/or by force-locking connected in a mounted state and which release the positive and/or force-locked connection by a planar motion, a partial rotation, and/or a current change to a released state. The device further includes: a material interface for receiving printed material output by the printer in the mounted state of the device, and at least one actuator for arranging the marking on the prolate object in a circumferentially closed manner by the printed product output by the printer or for providing the marking for circumferentially closed arrangement in the mounted state of the device.

27 Claims, 15 Drawing Sheets

(56) References Cited

U.S. PATENT DOCUMENTS

| | | | |
|---|---|---|---|
| 2002/0117263 A1* | 8/2002 | McKenney | B65C 9/44 156/64 |
| 2003/0146943 A1 | 8/2003 | Lehmkuhl et al. | |
| 2004/0211522 A1 | 10/2004 | Fries et al. | |
| 2008/0073023 A1 | 3/2008 | Fries et al. | |
| 2013/0175289 A1* | 7/2013 | Sternberg | B65C 9/1869 221/70 |
| 2018/0141694 A1 | 5/2018 | Hutchison et al. | |

* cited by examiner

TECHNIQUE FOR MARKING A PROLATE OBJECT

CROSS-REFERENCE TO PRIOR APPLICATIONS

This application is a U.S. National Phase application under 35 U.S.C. § 371 of International Application No. PCT/EP2020/077969, filed on Oct. 6, 2020, and claims benefit to Belgian Patent Application No. BE 2019/5668, filed on Oct. 9, 2019. The International Application was published in German on Apr. 15, 2021 as WO/2021/069423 under PCT Article 21(2).

FIELD

The invention relates to a technique for marking a prolate object, for example a conductor. In particular, the invention relates to a printing system comprising a device for providing a marking arranged or arrangeable in a closed manner around a prolate object.

BACKGROUND

For marking, for example, electrical conductors, label printers are conventionally used for printing a label which then has to be manually mounted on the conductor after printing. The document US 2003/146943 A1 describes a printer that alternately prints and cuts a label.

Furthermore, known special printers can be used for conductor labeling. The document US 2004/0211522 A1 describes a machine that winds a pre-printed wrap-around label on a spindle reel around a conductor. The document US 2008/0073023 A11 describes a monolithic machine for printing and applying wrap-around labels.

Such conventional printing systems can only print certain labels. Since an automated application is integrated, no other printing applications are possible with such a printing system.

The document U.S. Pat. No. 5,425,823 A describes a label printer combined with an application device for installation in a manufacturing facility to mark a plurality of individual product units with customized labels. The individual product units are transported through a checkweigher to determine the data to be printed on the label. The data is passed to a control system, which converts the data into commands for a label printer. The printer, in turn, prints either alphanumeric characters, bar codes, or other desired visual characters on the label. The motion of each product unit is matched with a corresponding label, and the label is applied to the product unit using a combined vacuum and air jet head.

However, such a conventional application device is adjusted and integrated using screws in a production line, so that changing the application device requires a time-consuming loosening of all electrical and compressed air connections, unscrewing the device, repeating the adjustment with the changed device, screwing on the device and connecting all individual lines.

SUMMARY

In an embodiment, the present invention provides a printing system, comprising: a printer configured to output a printed product; and a device configured to provide a marking arranged or arrangeable in a closed circumferential manner around a prolate object, wherein the device comprises a mechanical interface and the printer comprises a mechanical interface, which are positively and/or by force-locking connected in a mounted state and which are configured to release the positive and/or force-locked connection by a planar motion, a partial rotation and/or a current change to a released state, and wherein the device further comprises: a material interface configured to receive printed material output by the printer in the mounted state of the device, and at least one actuator configured to arrange the marking on the prolate object in a circumferentially closed manner by the printed product output by the printer or to provide the marking for circumferentially closed arrangement in the mounted state of the device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
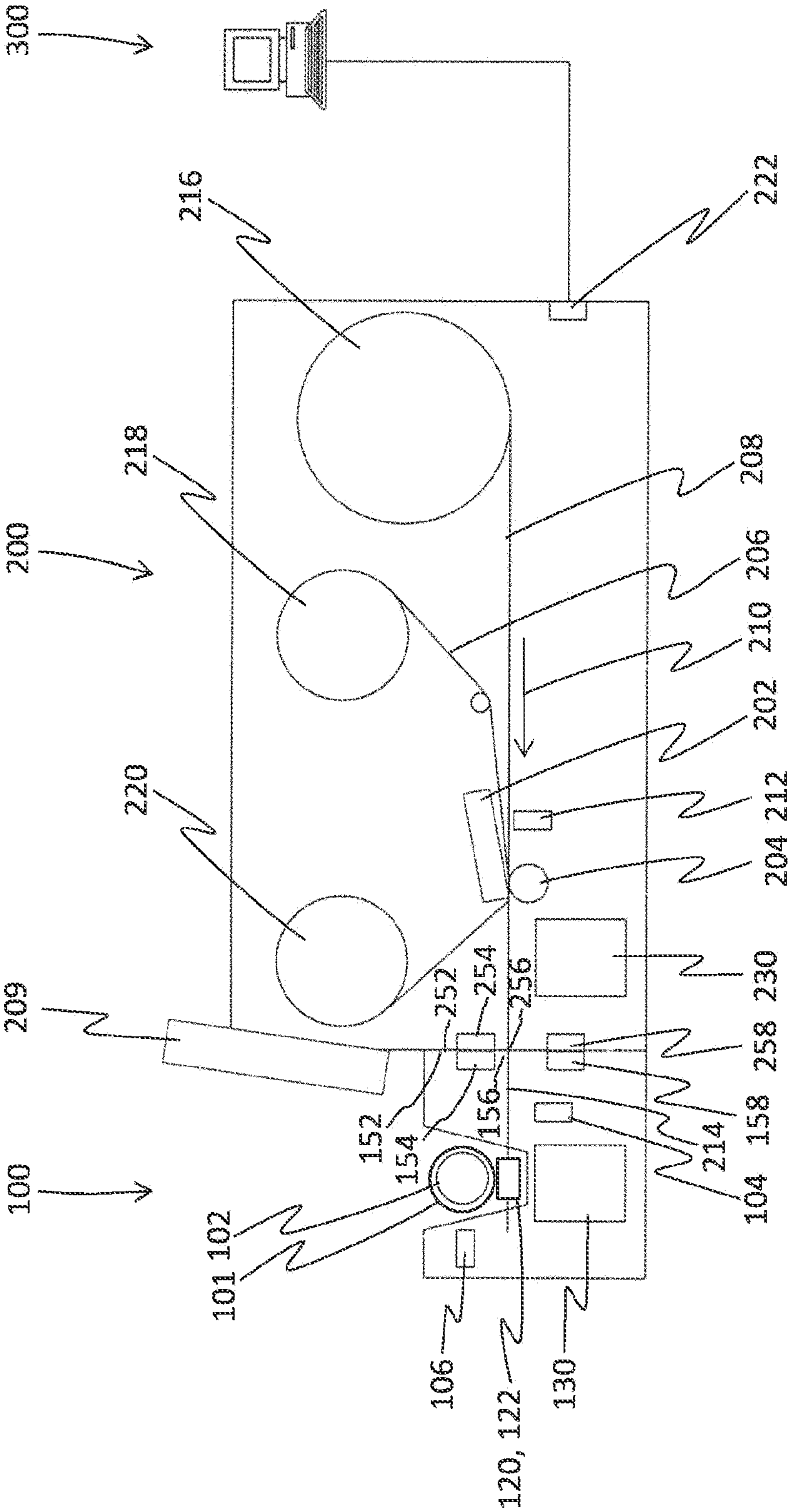
FIG. 1 a schematic sectional view of a first embodiment of a device for providing a marking attached to an embodiment of a printer.

In an embodiment, the present invention provides a printing system, preferably with the size and portability of a table-top device, so that the system can be quickly converted to various applications of object marking, preferably various applications of conductor marking.

One aspect relates to a printing system comprising a printer for outputting a printed product and a device for providing a marking arranged or arrangeable in a closed circumferential manner around a prolate object, preferably around a conductor. The device comprises a mechanical interface and the printer comprises a mechanical interface. In a mounted state, the mechanical interface of the device and the mechanical interface of the printer are connected positively and/or by force-locking, preferably magnetically. Further, the mechanical interface of the device and the mechanical interface of the printer are configured to release the positive and/or force-locked, preferably magnetic, connection by a planar motion, a partial rotation, and/or a change in current to a released state. The device further comprises a material interface configured to receive, in the mounted state of the device, the printed material output by the printer; and at least one actuator configured to arrange, in the mounted state of the device, the marking on the object in a circumferentially closed manner by means of the printed material output by the printer, or to provide the marking for circumferentially closed arrangement.

Embodiments of the printing system can enable rapidly changing (or exchanging) the device mounted on the printer by means of the planar motion, the partial rotation, and/or the current change. Based on the mechanical interfaces in the mounted state, same or further embodiments of the printing system may define the relative arrangement of further interfaces of the device (for example the arrangement of the material interface) relative to the printer and/or bring further interfaces of the device into operative connection. Manually connecting further ports between the printer and the device (in addition to the mechanical interfaces) can thus be omitted.

By positively locking the mechanical connection with a planar motion or partial rotation (preferably driven by an electric motor) and/or by holding the connection magnetically (preferably using an electromagnet and/or a permanent magnet), the connection can be released quickly and with little or no force.

The mechanical interfaces may be configured to releasably attach the device to the printer according to the selectively mounted (e.g., attached) or released (e.g., detached) state.

The force-locking connections may comprise a connection using forces between active (e.g., effective) surfaces of the mechanical interfaces of the device and the printer. The force-locking connection may comprise a field force-locking connection (for example, a connection using field forces, such as a magnetic force) and/or an elastic force-locking connection (for example, a connection using elastic elements to generate forces, such as springs) and/or a friction force-locking connection (for example, a connection using Coulomb's law of friction).

The planar motion and/or the partial rotation (or partial revolution) may be a geometric one-parameter motion, preferably a continuous or smooth motion. The one-parameter motion may comprise a circle, an arc (of a circle), and/or a section (or portion) of a helix.

The force-locking, preferably magnetic, connection may use a force (preferably magnetic force) to connect the device to the printer, at least in the longitudinal direction. Transversely to the longitudinal direction, the force-locking (preferably magnetic) connection may imply a friction-locking or positively locking connection. The force-locking (preferably magnetic) connection in the mounted state may comprise an interaction between an electromagnet and a ferromagnetic plate.

The printing system may further comprise a clamping screw configured to secure the mounted state, eliminate mechanical backlash in the mounted state, and/or (preferably additionally or dominantly) force-lock the mechanical interfaces in the mounted state.

The clamping screw may provide an additional connection (or locking) between the mechanical interfaces by force-locking, which (for example with regard to a force transmission and/or a force distribution) dominates compared to further contributions of the connection between the mechanical interfaces in the mounted state, for example dominates over a positive connection (e.g., form closure) in the mounted state.

The planar motion may be a motion within a plane. The planar motion may establish the positive and/or force-locking connection in the mounted state and release it in the released state.

The planar motion may comprise a planar motion of at least a section (or portion) of one of the mechanical interfaces with respect to at least a section (or portion) of the other one of the mechanical interfaces.

The planar motion may be a linear motion or a rotational motion (i.e., a turning movement). The simple linear motion or rotation can allow for a quick change of the device on the printer.

The planar motion may be a linear motion or a rotational motion about a given axis of rotation (i.e., a given axis perpendicular to the plane of motion). In contrast, a helical motion (e.g., screw motion) combines a rotation with a motion perpendicular to the plane of rotation, i.e., out of the plane of rotation.

The partial rotation may be a rotation or helical motion (e.g., screw motion) of less than 360°, preferably less than 270° or less than 180°. The short rotation or helical motion may allow for a quick change of the device on the printer.

The change in current to the released state may comprise turning on the current (i.e., energizing, for example for generating an opposing field) or turning off the current (i.e., interrupting the current).

In the mounted state, the mechanical interfaces may be positively connected against a force (for example, a pulling force) or a motion (for example, moving the device and printer apart) in the longitudinal direction. Alternatively or additionally, the mechanical interfaces may be connected to each other (for example, by force-locking) in the mounted state by or due to a force (preferably magnetic) acting in the longitudinal direction (for example, a magnetostatic attraction force between the mechanical interfaces).

The printer may be configured to output the printed product in a longitudinal direction. In the mounted state, the mechanical interfaces may be connected in the longitudinal direction positively and/or by force-locking, preferably magnetically.

One (i.e., a first one) of the mechanical interfaces may include a latch. The latch may be movably mounted (e.g., movable in a plane) for planar motion and/or partial rotation between the mounted state and the released state. In the mounted state, the latch may clamp or wedge (for example, wedge itself, i.e. get wedged) against a section (or portion) of the other mechanical interface (i.e., the other or second one of the mechanical interfaces) for positively connecting the mechanical interfaces and/or for positively connecting the mechanical interfaces by force-locking. Alternatively or additionally, the latch may be spaced from the section (or portion) in the released state.

Preferably, a clamping screw may be provided which, in the mounted state, is capable of clamping (e.g., bracing or jamming) the latch and the section.

By clamping the latch and the section, the mounted state may be secured and/or mechanical play (i.e., backlash) in the mounted state may be eliminated.

The latch may be an eccentric or slider. The section may be a flange (for example, the edge of an opening in the flange) or an undercut (for example, a groove).

The mechanical interface of the printer may comprise a plate and at least one stud projecting from the plate. A freestanding end (e.g., a free or separate end) of the at least one stud may have an undercut, preferably a transverse hole (e.g., a bore), a notch, a circumferential groove, or a shoulder or step.

The mechanical interface of the device may comprise a connection surface having an opening, preferably at a convex edge of the connection surface. Furthermore, the mechanical interface of the device may comprise a slider with a recess (or clearance) movable in the opening parallel to the connection surface. When transitioning from the released state to the mounted state, the connection surface may abut the plate and/or the planar motion or partial rotation of the slider may engage (or mesh) the recess with the undercut, preferably the groove.

The slider may be a longitudinal slider or a rotary slider.

The planar motion of the slider parallel to the connection surface may be a linear motion. The recess may be a longitudinal slot. Alternatively (or additionally with another slider), the planar motion of the slider parallel to the connection surface may be a rotary motion. The recess may correspond to an arc (of a circle).

The mechanical interface of the device may comprise a connection surface. Furthermore, the mechanical interface of the device may comprise, on a side of the connection surface facing away from the printer, a handle strip (e.g., grip bar) rotationally movable (i.e., rotatable) parallel to the connection surface. Alternatively or additionally, the mechanical interface of the device may comprise, on a side of the connection surface facing the printer, a slider with a recess that is rotationally movable parallel to the connection surface and preferably coupled to the handle strip in a rotationally fixed manner. During the transition from the released state to the mounted state, the connection surface may abut at (or bear against) the plate and/or the rotational movement, preferably partial rotation, of the handle strip may engage the recess with the undercut, preferably the groove.

The stud (e.g. bolt) may be connected to the plate in a tilt-resistant and/or tension-resistant manner. The stud may project in the direction of the device and/or perpendicular to the plate and/or perpendicular to the connection surface.

Preferably, the circumferential groove revolves around the longitudinal axis of the stud by at least 180° or at least 270° or completely (i.e. by 360°). As a result, the recess may be engaged or engageable with the groove by the planar motion transverse (preferably perpendicular) to the longitudinal axis.

The connection surface and/or the plate may be transverse, preferably perpendicular, to the longitudinal direction of the output printed product and/or to the longitudinal axis of the stud.

The mechanical interface of the device may comprise a flange having at least one opening. The mechanical interface of the printer may comprise a plate and at least one stud projecting from the plate. The stud may include a latch (each, if applicable) rotatably mounted at a free-standing end. In the released state, the at least one latch may be insertable or pluggable through a respective one of the at least one opening in the flange. In the mounted state, the flange may bear against the plate and/or the at least one stud may protrude through the respective opening in the flange and/or the at least one latch may bear against a side of the flange facing away from the printer.

The rotational movement of the latch may also be referred to as a pivoting movement. Preferably, the rotational movement is limited to less than a full revolution or less than half a revolution.

The mounted state may correspond to a first rotational position (e.g., a first angular position) of the latch and the released state may correspond to a second rotational position (e.g., a second angular position) of the latch (which is different from the first rotational position).

In the mounted state, the latch may be positively fixed on the side of the flange facing away from the printer, for example due to the second rotational position. A motion (for example in the longitudinal direction or parallel to the longitudinal axis of the stud) through the respective opening may be blocked, for example due to the second rotational position.

The at least one latch may be mounted for pivotal movement about a longitudinal axis of the stud. The at least one latch may have a first transverse dimension parallel to the connection surface or the plate, and a second transverse dimension perpendicular to the first transverse dimension, which is greater than the first transverse dimension. The respective opening of the connection surface may have a first transverse dimension greater than the first transverse dimension of the latch and less than the second transverse dimension of the latch. The respective opening of the connection surface may further have a second transverse dimension perpendicular to the first transverse dimension of the opening that is greater than the first transverse dimension of the opening and/or is greater than the second transverse dimension of the latch.

The at least one latch may be an eccentric mounted for rotational movement about an axis of rotation. The eccentric may be in a first rotational position in the released state, and may be in a second rotational position different from the first rotational position in the mounted state.

The axis of rotation may be perpendicular to the longitudinal axis of the stud and/or parallel to the plate and/or parallel to the flange.

In the first rotational position, an extent of the eccentric in any direction perpendicular to a longitudinal axis of the stud may be less than a transverse dimension of the opening in the respective direction. In the second rotational position, an abutment surface of the eccentric that is eccentric with respect to the rotational axis may extend beyond an edge of the respective opening and/or abut an edge of the respective opening.

The latch, slider, or eccentric may be wedge-shaped, preferably with active surfaces tapering in the direction of the mounted state and/or at least one active surface enclosing an acute angle with a plane of motion, a plane of partial rotation or the connection surface.

The planar motion or partial rotation, preferably the motion or partial rotation of the slider, the latch and/or the eccentric, may be electromotively driven and/or controlled by means of an actuator of the device.

The mechanical interface of the printer may comprise a ferromagnetic plate. The mechanical interface of the device may comprise an electromagnet. The electromagnet may be configured to induce magnetic flux through the ferromagnetic plate in the mounted state. Alternatively or additionally, the electromagnet may be configured to reduce or neutralize a magnetic flux through the ferromagnetic plate in the released state, for example by an opposing field (preferably directed opposite to the field of a permanent magnet or opposite to a remanence magnetization) or by an alternating field.

The mechanical interface of the device may comprise a permanent magnet. The mechanical interface of the printer may comprise an electromagnet and a ferromagnetic plate disposed between the permanent magnet and the electromagnet. The permanent magnet may be configured to induce magnetic flux through the ferromagnetic plate in the mounted state. The electromagnet may be configured to reduce or neutralize magnetic flux through the ferromagnetic plate in the released state.

The actuator may be configured to or controlled to drive the planar motion or partial rotation to the mounted state and/or the released state. Alternatively or additionally, the electromagnet may be configured to or controlled to establish the magnetic connection in the mounted state or to release the magnetic connection in the released state. For example, the actuator may be configured or controlled to drive the planar motion or partial rotation to the mounted state and/or the electromagnet may be configured or controlled to establish the magnetic connection in the mounted state in response to sensing or detecting the device (preferably by means of a sensor on the printer), a user input at a user interface of the printer, a voltage supplied by the printer at an electrical interface of the device, and/or an initial data exchange at a data interface of the device.

For example, the actuator and/or the electromagnet (e.g., a solenoid) may be connected to the electrical interface of the device. Alternatively or additionally, contacting the electrical interface or data interface through a corresponding electrical interface or data interface of the printer activates the actuator and/or the electromagnet and/or a control unit or regulating unit of the device or the printer to control or regulate the actuator and/or the electromagnet.

Alternatively or additionally, a user input at the user interface may control the actuator to drive the planar motion or partial rotation to the released state and/or control the electromagnet to release the magnetic connection in the released state.

The printing system may further comprise a cover that comprises a mechanical interface. The mechanical interface of the cover and the mechanical interface of the printer may be connected positively and/or by force-locking, preferably magnetically, in a mounted state. Optionally, the mechanical interfaces of the printer and the cover may be configured to release the positive and/or force-locking, preferably magnetic, connection by a planar motion or partial rotation and/or a change in current to a released state.

In the mounted state, the cover may cover at least the mechanical interface of the printer. Preferably, in the mounted state of the cover, the material interface may be open for output of the printed product. For example, in the mounted state, the cover may further cover the electrical interface and/or the data interface of the printer.

The device may further comprise an electrical interface configured to supply electrical power to the device, preferably the planar motion or partial rotation actuator and/or the electromagnet, via the printer.

The material interface (preferably of the device) may be arranged relative to the mechanical interface (preferably of the device) to receive, in the mounted state, the printed material output by the printer. Alternatively or additionally, the data interface (preferably of the device) may be arranged relative to the mechanical interface (preferably of the device) to contact the printer, preferably a data interface of the printer, for communication in the mounted state. Alternatively or additionally, the electrical interface (preferably of the device) may be arranged relative to the mechanical interface (preferably of the device) to contact, in the mounted state, the printer, preferably an electrical interface of the printer, for supplying electrical energy to the device, preferably for supplying electrical energy to the actuator of the planar motion or partial rotation and/or the electromagnet.

The device (for example, an applicator) may be attached to the mechanical interface of the printer. The mechanical interface of the printer and/or the mechanical interface of the device may comprise one or more quick-release fasteners and/or one or more centering pins (or comparable or similar elements) for a releasable connection to the other mechanical interface. This may allow for quick changeover of the device.

In one embodiment, the mechanical interface of the printer comprises at least one stud (e.g., a bolt). The stud has an undercut. In the mounted state, a latch (for example a slider or a wedge-shaped element) engages in this undercut.

In one embodiment, the mechanical interface of the printer comprises a latch (also: locking element), which in the mounted state dips (i.e., passes) through an opening in a connection surface (for example, a base plate or flange) of the device. Parallel to the connection surface, the latch has a first transverse dimension and a second transverse dimension perpendicular to the first transverse dimension that is greater than the first transverse dimension. The opening of the connection surface has a first transverse dimension greater than the first transverse dimension of the latch and less than the second transverse dimension of the latch. Further, the opening of the connection surface has a second transverse dimension perpendicular to the first transverse dimension of the opening that is greater than the first transverse dimension of the opening and/or greater than the second transverse dimension of the latch.

In one embodiment, the mechanical interface of the printer comprises an eccentric which, in the mounted state, plunges (or passes) through an opening in a connection surface (for example, a base plate or flange) of the device and, as a result of a rotational movement (also: pivoting movement) about a pivot axis of the eccentric, bears against a side of the connection surface that faces away from the printer with an abutment surface (or support surface) that is eccentric with respect to the pivot axis. Preferably, the eccentric is biased (e.g., by pretension) and/or secured beyond, or due to, its dead center in the mounted state.

Alternatively or additionally, the device comprises a print signal interface configured to acquire a control signal for outputting the printed product. Alternatively or additionally, the device comprises at least one sensor configured to acquire a control signal for providing the marking (i.e., a control signal indicative of the provisioning of the marking).

Alternatively or additionally, the device comprises at least one actuator that is configured to arrange the marking on the object in a circumferentially closed manner or to provide the marking for circumferentially closed arrangement, depending on the control signal for outputting the printed product and the control signal for providing the marking by means of the printed product output by the printer.

The device may be a device for circumferentially closed arrangement of a printed marking around a prolate object, preferably around a conductor.

The device may be configured as an applicator, stem or attachment of the printer, in particular a thermal transfer printer. The device may be interchangeable. Each of a plurality of different embodiments of the devices may be selectively attachable to the same printer.

The printer may receive an identifier via an interface (e.g., a network interface or a serial interface). The printer may be configured to print the received identifier onto a print medium using a print material. The print media may comprise an ink ribbon, such as for thermal transfer printing. The printing medium (i.e., a substrate or printing material) may be a plastic film, for example for heat sealing or welding, or a heat shrink tube. The printed product may comprise the printed medium printed by means of the printing material.

The providing may comprise arranging the marking on the prolate object, preferably arranging the marking circumferentially closed around or about a longitudinal axis of the prolate object. The at least one actuator may be configured to circumferentially arrange the printed marking about a longitudinal axis of the object.

For example, the actuator may arrange or provide the marking when the control signal of the print signal interface indicates the output of the printed product at the material interface and the control signal of the sensor indicates the presence of the object or a requested use to provide the marking.

The device and the printer may be arranged next to each other or side by side, for example without direct mechanical connection. For example, the printer and device may each be arranged in a stationary and/or non-slip manner on the same work surface. For example, a material interface of the printer may be aligned with or covered by the material interface of the device. There may be a clear gap between the printer and the device during operation.

The device may further comprise a mechanical interface configured to releasably or irreversibly attach the device to the printer.

The attachment may be irreversible, for example, may comprise a material connection (i.e., may be materially bonded). Alternatively, the device may be removably attached to the printer, for example, may be non-destructively detachable, and/or may be attachable and/or detachable without tools.

The at least one sensor of the control signal for providing the marking may be configured to sense (e.g., acquire) or detect the object, preferably to detect a presence, a location, and/or a size of the object.

The control signal for providing the marking may indicate the presence (i.e., the presence), the location, and/or the size of the object. The location may comprise a position and/or orientation of the object (for example, a longitudinal axis of the object). The size may comprise a length (for example, along the longitudinal axis), a width, a diameter, and/or a perimeter of the object.

The at least one sensor of the control signal for providing the marking may detect or acquire the object without contact.

The at least one sensor of the control signal for providing the marking may comprise a push button. The control signal for providing the marking (also: control signal for the provision of the marking or marking provision control signal) may indicate an actuation of the button (also: provision request).

The marking provision control signal may indicate a user request to provide the marking. The marking provision control signal may be a trigger signal. The actuator may be configured to arrange the marking on the object in a circumferentially closed (e.g., loop) manner or to provide the marking for circumferentially closed arrangement in response to the detection of the object and/or the acquiring of the trigger signal.

The push button may be a foot switch or a hand switch.

The print signal interface may comprise a sensor configured to sense (e.g., detect or acquire) the output of the printed product from the printer, preferably to sense (e.g., detect or acquire) a presence, a position, and/or a feed of the output printed product.

The sensor for detecting the output of the printed product (also: sensor for detecting the output of the printed product, or in short: sensor for detecting the printed product) may be arranged at the material interface. The sensor for detecting the printed product may detect the printed product without contact (i.e., contactless).

The at least one sensor may further comprise a sensor for detect the printed product output from the printer. Detecting the printed product may include sensing the presence, a location (e.g., position and/or orientation), and/or a size (e.g., length and/or diameter) of the printed product.

Alternatively or additionally, the print signal interface may comprise a data interface configured to communicate, preferably bidirectionally, with the printer for providing or arranging the marking.

The at least one actuator may be configured to (for example, in response to detecting the object and/or acquiring the trigger signal) to process, in communication with the printer, the printed product output by the printer for marking and to arrange, or provide for arrangement of, the marking on the object.

The bidirectional communication may comprise receiving the control signal for outputting the printed product from the printer and sending a control signal for requesting output of the printed product to the printer. For example, the control signal for providing the marking may be forwarded to the printer via the data interface as a request for output of the printed product.

The printer may be configured to deliver the printed product to the device at the material interface, for example, in accordance with the bidirectional communication and/or in response to the control signal to provide the marking.

The data interface may be configured for wireless communication, preferably using radio signals, infrared signals, and/or near field communication.

The data interface may be configured to synchronize or coordinate alternating and/or event-driven operation of the at least one actuator and the printer to provide or arrange the marking.

For example, a feed of the printed product performed by the printer may be alternately performed, synchronized, and/or coordinated with a cutting, folding, and/or wrapping of the output printed product. The respective sub-steps executed during alternating and/or event-driven operation by the device or the printer for providing or arranging the marking may also be referred to as actions. The coordination of the sub-steps may also be referred to as action coordination.

The data interface may be configured to enable the printer to control the at least one actuator of the device, to read control signals from the at least one sensor and/or the print signal interface of the device and/or an identifier stored in the device.

The at least one actuator of the device may be controlled or controllable on the printer side by means of the data interface. Alternatively or additionally, measured values of the at least one sensor of the device may be queried (e.g., interrogated) by means of the data interface.

The data interface may be electrically connected within the device to the at least one actuator and/or the at least one sensor.

The data interface may be configured to receive control commands for controlling or regulating the at least one actuator from the printer and/or to send control commands for controlling or regulating the printer to the printer based on the control signals from the at least one sensor and/or the print signal interface.

The data interface may be electrically connected to the at least one actuator and/or the at least one sensor within the device via a control unit and/or a regulating unit. The control unit and/or regulating unit may determine parameters of the applicator from the acquired measured values. The control commands sent to the printer may comprise the parameters and/or control the printer according to the parameters.

The data interface may be configured to send control signals (for example, control commands and/or confirmation messages) from the at least one sensor and/or the print signal interface, and/or parameters determined from the (aforementioned) control signals, to the printer for providing or arranging the marking.

The device may further comprise a control unit or regulating unit configured to control or regulate the at least one actuator of the device depending on the control signals of the at least one sensor, measured values of the printer received via the data interface, confirmation messages of the printer received via the data interface, and/or control commands of the printer received via the data interface for arranging or providing the marking.

The control unit or regulating unit may be further configured to obtain (e.g., receive) a control command from the printer via the data interface, to execute control or regulation of the at least one actuator in accordance with the control command, and to send feedback to the printer via the data interface in response to completion of execution of the control command.

The feedback may comprise a confirmation of the (for example successful) completion of the execution of the control command or an error message about an error during the execution of the control command. For example, the feedback may inform the printer that a defined state of the device has been reached, such as an end position of the at least one actuator.

The control unit or regulating unit may further be configured to determine a parameter of the arrangement based on the control signal detected by means of the at least one sensor, and to send the determined parameter to the printer via the data interface.

The detected control signal may be indicative of a diameter or circumference of the object. The determined parameter may be indicative of a length of a feed (e.g., an advance) or a retraction of the printed product.

A control command sent from the device to the printer via the data interface may initiate the (e.g., advance) or the retraction.

The control unit or regulating unit may autonomously perform the providing or arranging of the marking, or a substep of the providing or arranging of the marking in accordance with the control command during the time period between obtaining (e.g., receiving) the control command from the printer and sending the feedback to the printer.

The device may further comprise an electrical interface configured to supply electrical power to the device via the printer.

The data interface and/or the electrical interface may be arranged relative to the mechanical interface to contact the printer to communicate with, or supply electrical power to, the device when the device is attached to the printer via the mechanical interface.

The data interface may be arranged relative to the mechanical interface to contact the printer for communication when the device is attached to the printer by the mechanical interface. The electrical interface may be arranged relative to the mechanical interface to contact the printer for power supply when the device is attached to the printer by the mechanical interface. For example, attaching the device to the printer by means of the mechanical interface may cause contacts of the data interface and/or the electrical interface to become connected.

The object may comprise a conductor or may be a conductor. The conductor may be a conductor for electoral current or a light guide.

The mechanical interface may comprise a centering pin or an opening for receiving a centering pin and/or a lever and an eccentric connected to the lever in a rotationally fixed manner, which eccentric is configured for fastening the device to the printer without screws and/or without tools.

Another aspect relates to a system (also: printing system) for providing a marking arranged or arrangeable in a closed circumferential manner around a prolate object, preferably around a conductor. The system comprises a printer, preferably a thermal transfer printer, configured to output a printed product. Furthermore, the system comprises a device according to an embodiment of the device aspect, wherein the material interface may be arranged, relative to the printer, to receive the printed product output by the printer.

Embodiments of the device aspect enable a modular system (also: printing system) that may be based on a single printer, for example a desktop device, such that this printer may be converted to the various applications of object marking, preferably conductor marking, in a short time or few steps. For example, a user can quickly and easily form a system from a normal or application-unspecific label printer for assisting in applying a marking (for example, a label) to the prolate object to be marked, preferably the conductor to be marked.

The terms application and applying (preferably as a process step) may be construed herein as synonymous or interchangeable. The terms arrangement and arranging (preferably as a process step) may be construed herein as synonymous or interchangeable.

Applying the marking on or to the prolate object (preferably on or to the conductor) may comprise arranging the marking on or at the prolate object. Providing the marking arranged or arrangeable in a circumferentially closed manner around the prolate object (preferably around the conductor) may comprise cutting (preferably trimming) the printed product.

The prolate object may be an elongated object. At least in sections, the prolate object may be a (for example, general) cylinder, preferably a circular cylinder or a prism.

The prolate object may have a longitudinal axis. An extent of the object in the direction of the longitudinal axis may be greater (for example, several times greater) than one or any extent of the object transverse or perpendicular to the longitudinal axis.

The prolate object may be a conductor, a tube, a vessel, or a housing. The conductor may be an elongate object for conducting signals or substances. For example, the conductor may be an elongate object for conducting electrical current and/or electromagnetic radiation (preferably light). The vessel may be a test tube or a sample tube, for example for holding and/or transporting a fluid.

The conductor may comprise one core or two, at least two, three or more cores electrically insulated or optically decoupled from each other. The cores may be parallel to each other or may be twisted with each other (for example, in pairs).

The core or the conductor may be a single wire or a plurality of, fine and/or superfine stranded conductors.

The conductor may be a cable, cable bundle, and/or ribbon cable. The conductor may be a light guide (also: optical fiber). The conductor may be a tube and/or a fluid line or conduit.

The conductor may be a cylindrical body and/or a non-rotationally symmetric elongated body. The conduction of the signals or transport of the substances may be directed along a longitudinal axis of the conductor and/or may extend between ends of the conductor.

By allowing embodiments of the device for a specific application to be attached to a printer that is not specific to the application, special printers for the respective application, and thus costs, can be avoided and/or resources can be used more effectively. For example, a utilization rate of the printer may be increased as a result. The same or further embodiments of the device may reduce a downstream manual effort in mounting the printing materials on the objects to be marked.

FIG. 1 shows an embodiment of a device generally designated by reference numeral 100 for providing (for example, for outputting, arranging and/or applying) a marking 101 arranged or arrangeable in a closed circumferential manner around a prolate object 102, preferably around a conductor.

The device 100 comprises a material interface 156 configured to receive a printed material 214 output from a printer 200. Further, the device 100 comprises a print signal interface (for example, a sensor generally designated herein by reference numeral 104 and/or a data interface generally designated herein by reference numeral 158) configured to acquire a control signal for outputting the printed product 214. Further, the device 100 comprises at least one sensor 106 configured to acquire a control signal for providing the marking 101.

Further, the device 100 comprises at least one actuator (for example, at least one of the actuators generally designated herein by reference numerals 120 and 122) configured to arrange the marking 101 on the object 102 in a closed circumferential manner or to provide the marking 101 for closed circumferential arrangement, depending on the control signal for outputting the printed product 214 and the control signal for providing the marking 101 by means of the printed product 214 output from the printer 200.

Optionally, the device 100 comprises a mechanical interface 152 configured to removably attach the device 100 to a printer 200.

The print signal interface comprises, for example, a data interface 158 configured to communicate with the printer 200 for providing the printed marking 101. The control signal for outputting the printed marking 214 may be received by the printer (for example, its controller or control unit generally designated by reference numeral 230). Alternatively or additionally, the print signal interface comprises a sensor 104 configured to sense (e.g. detect or acquire) the output of the printed product 214.

For example, the sensor 106 of the device 100 is configured to sense the object 102, preferably the conductor 102, (for example, its presence and/or size, preferably width or diameter). Alternatively or additionally, the sensor 106 comprises a button, the actuation of which initiates the provisioning.

Through the material interface 156, the device 100 receives the printed material 214 output by the printer 200. The at least one actuator (for example, at least one of the actuators generally designated herein by reference numerals 120 and 122) of the device 100 may be configured (preferably controlled) to provide (for example, apply or arrange) the marking 101 and/or to apply (for example, arrange) the marking 101 to the object 102 (preferably the conductor) by means of (i.e., using) the printed material 214 output by the printer 200 in response to the communication with the printer 200 (for example, via the data interface 158) and/or detection of the object 102 (preferably the conductor), for example, by means of the sensor 106.

For a concise description, and without limitation of the prolate object 102, a conductor is described below as an example of the prolate object 102.

Preferably, the device 100 further comprises an electrical interface 154 for supplying power to the device 100 via the printer 200. Alternatively or additionally, the device 100 may comprise its own power supply, such as a power supply for connection to a power grid or a rechargeable electrical energy storage device (such as a secondary cell).

Optionally, the device 100 comprises a control unit 130 or regulating unit 130 configured to control or regulate the at least one or each actuator (for example, the actuator 120 and/or 122) of the device 100, for example, according to a controlled variable whose actual value is detected by the sensor 106 as measured values. Alternatively or additionally, the control unit 130 or the regulating unit 130 may be configured to acquire the measured values from the at least one sensor 104 and/or 106 and send them to the printer 200 via the data interface 158. Alternatively or additionally, the control unit 130 or the control unit 130 may be configured to receive control commands for controlling or regulating the at least one actuator (for example, the actuator 120 and/or 122) from the printer 200 via the data interface 158 and/or to send control commands for controlling or regulating the printer 200 to the printer 200 based on measured values of the at least one sensor 106.

The printed product 214 may be a printable medium 208 printed by the printer 200. The printable medium 208 may be a printable tape (preferably plastic tape or adhesive tape) or a printable film (preferably plastic film or adhesive film). The printable film may have a self-adhesive layer on a side opposite the printing, or may be weldable to itself (preferably end-to-end) and/or the conductor by the application of heat. Alternatively or additionally, the printing medium 208 may comprise a tube (for example, a heat shrink tube).

The first actuator 120 (also: cutting unit) may be configured to cut the printed product 214. The cutting unit may be configured to cut the printed product 214 in a transverse direction 121 transverse, preferably perpendicular, to the longitudinal direction of the printed product 214. Alternatively or additionally, the second actuator 122 may be configured to provide the cut printed product 214, preferably to arrange it on the conductor.

The marking 101 may comprise a portion of the printed product 214, for example a portion of the printed product 214 cut by the device 100 by means of the at least one actuator (for example 120 and/or 122). The marking 101 may also be referred to as a label.

The marking 101 may be a printed wrap-around label, a printed flag label, or a printed portion of the tube.

Applying the marking 101 to the conductor 102 may comprise a material connection of the marking 101 to the conductor 102. To this end, the marking 101 may be self-adhesive or heat bondable. For example, the marking 101 may be a flag label that is wrapped around the conductor 102 during application and bonded to itself over a surface (or in a two-dimensional manner) at both ends of the marking 101. In another example, the marking 101 may be a wrap-around label that is wrapped around the conductor 102 and connected to itself over a surface (or in a two-dimensional manner) during application. Alternatively or additionally, applying the marking 101 to the conductor 102 may comprise a positive-fit connection (for example, displaceable in the longitudinal direction of the conductor) of the marking 101 to the conductor 102. For this purpose, the marking 101 may comprise a tube (for example, a shrink tube) and/or a film (for example, a weldable thermoplastic film) that can be bonded to itself at the ends (preferably by the action of heat).

Applying the marking 101 to the conductor 102 by means of the at least one actuator 120 or 122 may comprise opening the tube and/or sliding the tube (for example the shrink tube) as the marking 101 onto the conductor 102, wrapping the marking 101 around the conductor 102, wrapping the marking 101 around the conductor 102 and closing the marking 101 as a flag label, sliding the marking 101 into a transparent grommet on the conductor 102, and/or printing a tag as the marking 101 that may be clipped around the conductor 102.

The device 100 may be configured to apply the marking 101 to the conductor 102 when the conductor 102 is already assembled (for example, when ends of the conductor are contacted and/or not free ends). For example, during application, the conductor 102 may not be rotated about a transverse axis transverse to the longitudinal direction of the conductor 102, may not be rotated about a longitudinal axis parallel to the longitudinal direction of the conductor 102, and/or may be at rest.

The marking 101 applied to the conductor 102 may be captive. Alternatively or additionally, a printed surface of the applied marking 101 may be flat or substantially free of curvature. For example, the printed surface may be arranged between two embossments. As a result, the printed surface may be easily readable and/or sufficiently large.

The marking 101 may be durable, for example, in terms of printing (preferably by the printer 200 being a thermal transfer printer), in terms of the material of the printing medium 208 (for example, by the printing medium being a plastic film), and/or in terms of attachment to the conductor 102 (for example, by the marking 101 being positively or materially (e.g., firmly bonded or adhesively) connected to the conductor 102).

A marking 101 may be space-saving, for example such that a plurality of conductors 102 each carrying such a marking 101 may be closely spaced. Alternatively or additionally, the marking 101 may be displaceable (i.e., movable) and/or rotatable, for example by positively connecting the marking 101 to the conductor 102. This can allow the marking 101 to be aligned on conductors 102 (such as cables) that are in close proximity to each other.

The first embodiment of the device 100 shown in FIG. 1 is attached to an embodiment of the printer generally designated by reference numeral 200. While the embodiment of the printer 200 shown in FIG. 1 is shown and described in connection with the first embodiment of the device 100, the other embodiments of the device 100 may also be attachable (preferably alternately) to the embodiment of the printer 200.

The embodiment of the printer 200 comprises a print head 202, a print roller 204, a photoelectric sensor 212 for detecting (or acquiring) the print medium 208 (i.e., the material to be printed), for example, for detecting control holes, (for example, black) control marks, a beginning and/or an end of the print medium 208. The print material 206 is, for example, an ink ribbon.

The material 208 to be printed is guided, along with the ink ribbon 206, between the print head 202 and the platen 204. The photoelectric sensor 212 may detect a beginning of the printing medium 208 during printing to ensure positioning of the printed image within the portion of the printed product 214 by means of which the marking 101 is formed.

The printer 200 comprises interfaces that are spatially associated with and/or functionally correspond to respective interfaces of the device. The spatially associated and/or functionally corresponding interfaces are connected or connectable to each other in pairs.

Preferably, the printer 200 comprises a mechanical interface 252 connected or connectable or in communication or exchange or configured for communication or exchange with the mechanical interface 152 of the device 100. Preferably, the spatial association implies that when the mechanical interface 152 and 252 are connected (e.g., interlocked), the other interfaces of the device 100 and the printer 200 are also mutually connected or brought into communication or exchange.

Alternatively or additionally, the printer 200 comprises a data interface 258 that is connected or connectable to, or in communication or exchange with, the data interface 158 of the device 100. Alternatively or additionally, the printer 200 comprises a material interface 256 that is connected or connectable to, or in communication or exchange with, the material interface 156 of the device 100.

For example, the material interfaces 156 and 256 are in communication or connection for exchanging the printed product 214. The data interfaces 158 and 258 are in communication or connection for exchanging measurement data from the respective sensors 104, 106, and/or 212 and/or control commands from the control unit 130 of the device and/or from a control unit 230 of the printer 200.

Optionally, as shown by way of example in FIG. 1, the printer 200 comprises an interface 222 to a computer or computer network 300 (for example, a connection to the Internet). The printer 200 (for example, its controller or control unit 230) may receive print jobs via the interface 222.

The device 100 for applying the marking 101 to the conductor 102 is also referred to as an applicator.

An embodiment of the applicator 100 (for example, the aforementioned first embodiment of the applicator 100) or a printing system (for short: system) comprising an embodiment of the applicator 100 and an embodiment of the printer 200 (for example, the aforementioned embodiment of the printer) are configured to perform one or more of the following functions and method steps.

The applicator 100 and the printer 200 may alternately perform operations (also referred to as actions), i.e., a set of one or plurality of procedural steps, particularly when applying the marking 101 to the conductor 102. In doing so, the applicator 100 and the printer 200 communicate with each other via the data interfaces 158 and 258, respectively, for example, to coordinate parameters and/or timing of the operations (preferably the next operation in each case). The alternating execution of the operations is also referred to as interleaved operation of the applicator 100 and the printer 200.

In a first implementation, an overall procedure control (or sequence control) is stored (e.g., implemented or executably stored) in the printer 200, for example, in the control unit 230 (preferably by means of firmware stored in the control unit 230). The overall procedure control may comprise printing on the print medium 208 and applying the printed product 214 resulting from the printing.

A procedure control (or sequence control) of the applicator 100 may be stored (e.g., implemented or executably stored) in the applicator 100 and/or the printer 200. The procedure control of the applicator 100 may comprise (preferably exclusively) applying the marking 101 to the conductor 102 using the printed product 214. For example, applying the marking 101 to the conductor 102 involves executing the procedure control of the applicator 100.

In other words, executing the procedure control of the applicator 100 may be partially or entirely in the applicator 100 or exclusively executed in the printer 200. In any case, executing the procedure control of the applicator 100 causes the marking 101 to be applied to the conductor by means of the applicator 100.

In a first variant of the first implementation, the procedure control (e.g., sequence control) of the applicator 100 is stored in the printer 200. The applicator 100 preferably does not have any sequence control, for example also no control unit 130. The control unit 230 of the printer (for example the firmware of the printer 200 in the control unit 230) is configured to (preferably individually) control (or drive) the actuators (for example 120 and/or 122) or (preferably individually) query (or detect) the sensors (for example 104 and/or 106) of the applicator 100 via the data interfaces 158 and 258.

In a second variation of the first implementation, the procedure control (e.g., sequence control) of the applicator 100 is stored (e.g., implemented or executably stored) in the applicator 100. For example, the applicator 100 comprises the control unit 130 or the regulating unit 130 in which the sequence control of the applicator 100 is stored (e.g., implemented or executably stored). Preferably, the control unit 130 or the regulating unit 130 is configured to control or regulate the applicator. For simplicity and without limitation, reference is made herein to the control unit 130, i.e., the function of a regulator (e.g., closed-loop control) is optionally comprised.

The execution of the procedure control (or sequence control) (preferably in the control unit 130) is started by the printer 200 (for example, the control unit 230, preferably by means of the printer firmware). For this purpose, the applicator 100 may receive a control command via the data interface 158 or may be energized via the electrical interface 154. As soon as an operation of the applicator 100 is required, the printer 200 (for example the control unit 230, preferably by means of the printer firmware) outputs a signal as a control command to the applicator 100 via the data interface 258 or 158.

Preferably, the printer 200 waits while the applicator 100 performs the requested operation (for example, initiated by means of the control command). Once the applicator 100 sends (e.g., reports) a signal via the data interface 158 or 258 as a control command for the completion of the operation, the printer 200 continues execution of the overall procedure control.

Optionally, the signal from the applicator 100 to the printer 200 indicates a status of completion of the operation. For example, the status may indicate successful completion or an error that occurred during execution of the operation.

In a second implementation, the applicator 100, for example the control unit 130 (preferably using firmware of the applicator 100) executes the overall procedure control (i.e., the overall operation). In other words, the overall procedure control is stored (e.g., implemented or executably stored) in the applicator 100, for example, in the control unit 130 (preferably by means of firmware stored in the control unit 130). By executing the overall procedure control, the applicator 100 controls the overall flow.

The printer 200 acts as a slave in the overall operation. For example, the printer 200 has sovereignty over the printed image, i.e., the printer 200 (preferably its control unit 230) performs the printing as an operation of the printer 200 in response to a corresponding control command from the applicator 100. Optionally, the printer 200 issues a control command (i.e., a first start command) to execute the overall procedure control, for example, because only the printer 200 is aware of the content and/or the presence of a print job.

To implement the interleaved (or alternating or nested) operation, the applicator 100 and the printer 200 exchange information (for example, measurement data and/or control commands) using the data interface 158 and 258, respectively.

The exchanged information may comprise measured values (for example, electrical voltages, electrical currents, electrical frequencies), preferably measured values of the sensor 104 and/or 106, which are transmitted (i.e., transferred or sent) from the applicator 100 to the printer 200. Alternatively or additionally, measured values of a sensor of the printer (for example, the photoelectric sensor 212) may be transferred (i.e., sent) from the printer 200 to the applicator 100. The applicator 100 or the printer 200 may determine (for example, calculate) sequence control parameters based on the measured values and/or transmit the measured values or the parameters to the computer or computer network 300 (for example, to application software) via the interface 222.

For example, the sensor 106 may sense or acquire a diameter or circumference of the conductor 102 (or the prolate object about its longitudinal axis). The control unit 130 and/or the control unit 230 may determine a length of a feed of the pressure medium 208 and/or a selection of the pressure medium 208, for example, depending on the sensed or acquired diameter or circumference.

Furthermore, when a defined threshold value is exceeded, these measured values may be transferred as a digital signal (for example, either as a state “0” or a state “1”) to the data interface 158 or 258, respectively, in order to inform the respective other (printer 200 or applicator 100) of the attainment of a defined state (for example, the completion of an operation). For example, the reaching of an end position or a reference point of an actuator (for example, the actuator 120 and/or 122) may be indicated.

A reference move (or reference run) of an actuator of the applicator 100 (for example, the actuator 120 and/or 122) may be used to mechanically move an actuator (i.e., a drive connected to a mechanism of the applicator 100) to a determined position of the actuator (i.e., the mechanism), referred to as a reference position. A control command from the printer 200 or a process step of the operation, sequence control, and/or overall sequence control performed by the applicator 100 may comprise a motion (for example, a travel command) of the actuator, with the reference position serving as a reference point for the motions (or moves).

When the control unit 130 of the applicator 100 (for example, the applicator firmware) calculates one or more parameters of the applying (i.e., procedure control) from measured values (for example, transferred from the printer 200 or acquired from the sensor 104 and/or 106), the parameter(s) may be transferred to the control unit 230 of the printer 200 (preferably to the printer firmware thereof) in accordance with a communication protocol via the data interface 158 and 258. Furthermore, the control unit 130 of the applicator 100 (preferably its applicator firmware) may also use measurement data acquired by the printer 200 (for example, measurement data from the light barrier 212) to control the sequence control of the applicator (for example, as parameters of the applicator).

The printer 200 may be configured to print normal labels, for example, when no device 100 is attached to the mechanical interface 152 and/or the data interface 158.

The printer 200 may be a thermal transfer printer. The thermal transfer printer may provide high contrast and consistent marking 101. For example, the printer 200 may be a thermal transfer roll printer.

The embodiment of the printer 200 comprises an unroller 216 (or source roller) of the print media 208 disposed upstream of the print head 202, an unroller 218 of the print media 206 disposed upstream of the print head 202, and a rewinder 220 (or target roller) of the print media 206 disposed downstream of the print head 202.

An electrical interface 254 of the printer 200 is configured to supply electrical power to the applicator 100 attached to the printer via the electrical interface 154 thereof.

Optionally, the printer comprises a display 209, preferably user interface with a touch-sensitive screen. The control unit 230 and/or the control unit 230 of the printer 200 may be in signal communication with the display 209, for example, to display a message or to select or enable a print job.

The embodiments of the mechanical interfaces 152 and 252 described at the beginning or below (and optionally shown in additional detail in FIGS. 2A to 5) may be implemented individually or in combination in any embodiment of the device 100 and in any embodiment of the printer 200. Further, corresponding mechanical interfaces 152 and 252 may be interchanged, i.e., a mechanical interface 152 described in the context of the device 100 may be implemented as a mechanical interface 252 on the printer 200, and vice versa.

Features with reference numerals matching those in other embodiments may be consistent and/or interchangeable between embodiments.

Figure 2B:
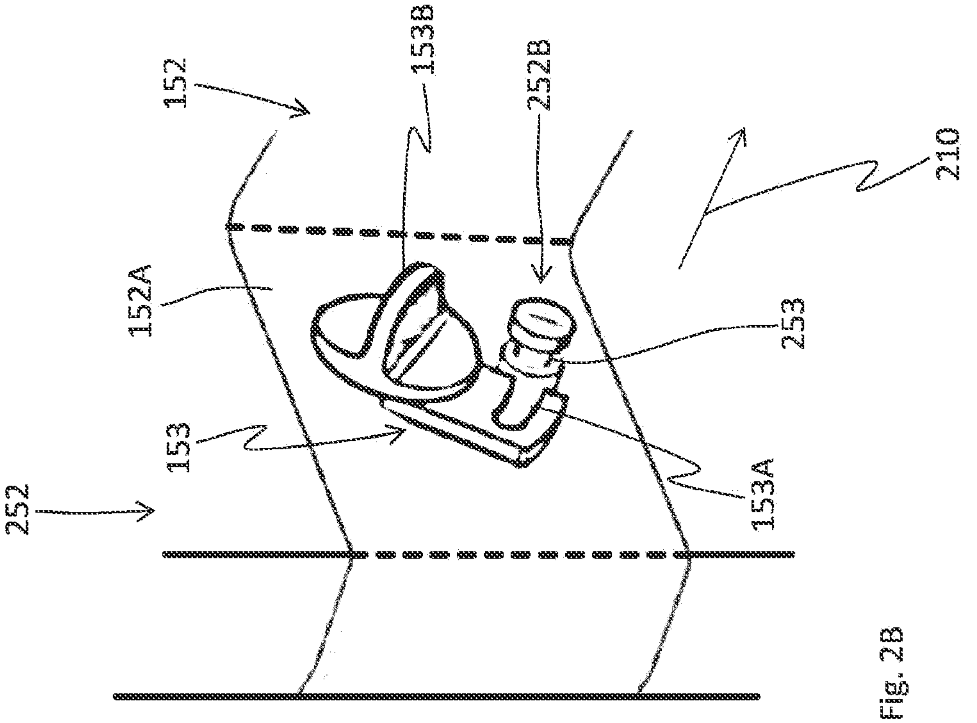
FIG. 2B a schematic perspective view of corresponding second embodiments of the mechanical interfaces of the device and the printer.
Figure 2A:
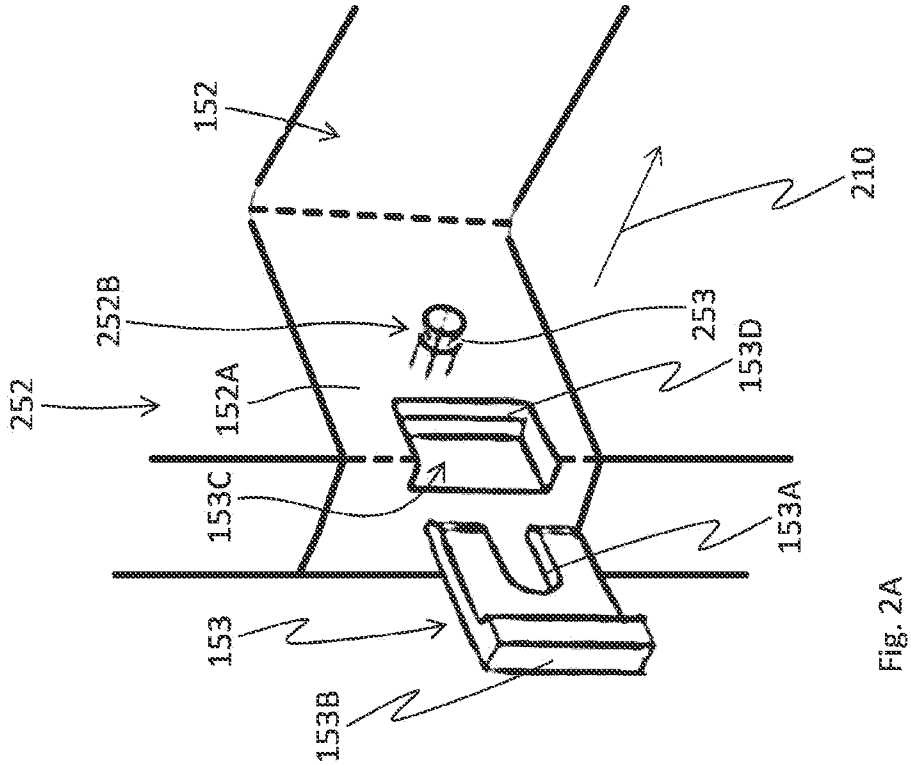
FIG. 2A a schematic perspective view of corresponding first embodiments of the mechanical interfaces of the device and the printer.

FIG. 2A schematically illustrates a perspective view of corresponding first embodiments of the mechanical interface 152 and the mechanical interface 252, each of which may be implementable at each embodiment of the device 100 and each embodiment of the printer 200, respectively.

A stud 252B protrudes from the mechanical interface 252 of the printer 200, for example parallel to the longitudinal direction 210 of the print medium 208. For better illustration, a connection surface 152A of the mechanical interface 152 of the device 100 located above the connection surface 152A in the mounted state of the device 100 is shown transparently in FIG. 2A to allow viewing of the stud 252B of the mechanical interface 252 of the printer 200 located behind the connection surface 152A. At the exposed end, the stud 252B has an undercut 253 (preferably perpendicular to the longitudinal direction 210), for example a head wider than a shank of the stud or a circumferential groove 253 configured for positive connection (i.e., positive-fit connection, preferably releasable) to the mechanical interface 152 of the device 100.

The mechanical interface 152 of the device 100 comprises a connection surface 152A. An opening 153C is provided at a convex edge of the connection surface 152A, into which a slider 153, preferably a wedge, is pushed transversely to the longitudinal direction 210 (for example perpendicular to the longitudinal direction 210) and/or parallel to the connection surface 152A from the opening 153C in the direction of the stud 252B. A recess 153A in the slider 153 (preferably at the tapered end of the wedge) is configured to engage the circumferential groove 253 of the stud 252B. As a result, the stud 252B of the mechanical interface 252 is positively connectable (and preferably frictionally connectable and/or backlash-free) in the longitudinal direction 210 to the slider 153 disposed in the connection surface 152A.

Preferably, a handle strip (e.g., grip strip) 153B is formed on an end of the slider 153 opposite the recess 153A. Moreover, this may serve as a stop which rests against the edge 153D of the opening 153C when the slider 153 is inserted (e.g., pushed) into the opening 153C in the mounted state of the device 100.

FIG. 2B schematically illustrates a perspective view of corresponding second embodiments of the mechanical interface 152 and the mechanical interface 252, each of which may be implementable on any embodiment of the device 100 or any embodiment of the printer 200.

The mechanical interface 252 of the printer 200 may comprise a stud 252B projecting from a plate of the printer 200, for example parallel to the longitudinal direction 210 of the print medium 208. The second embodiment of the mechanical interface 252 may be the same as the first embodiment. Also in FIG. 2B, a connection surface 152A of the mechanical interface 152 of the device 100 located above the stud 252B in the mounted state of the device 100 is shown transparently to provide a view of the stud 252B of the mechanical interface 252 of the printer 200 located behind the connection surface 152A.

The mechanical interface 152 of the device 100 comprises a connection surface 152A. A rotary handle having a handle strip 153B is rotatably mounted on the side of the connection surface 152A facing away from the printer 200. The handle strip 153B is non-rotatably connected to a (preferably wedge-shaped) rotary slide 153 on the side facing the printer 200. An axis of rotation of the handle strip (or grip bar) 153B and/or the rotary slide may be parallel to the longitudinal direction 210. A recess 153A in the slide 153 (preferably at the tapered end of the wedge-shaped rotary slide) is configured to engage the circumferential groove 253 of the stud 252B. As a result, the stud 252B of the mechanical interface 252 is positively connectable (and preferably frictionally connected and/or backlash-free) to the slider 153 disposed in the connection surface 152A in the longitudinal direction 210.

Figure 3A:
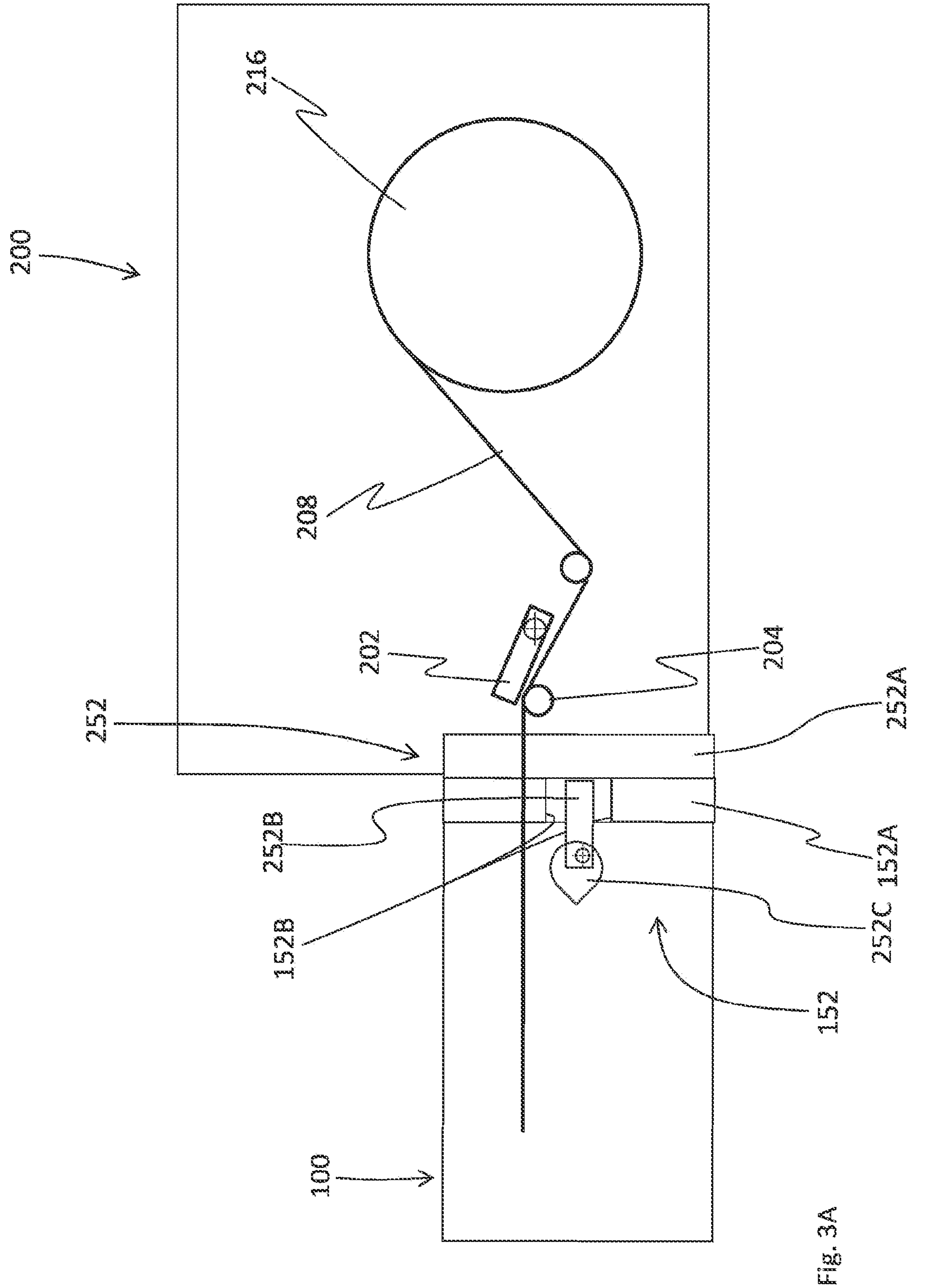
FIG. 3A a schematic sectional view of the device and the printer with corresponding third embodiments of the mechanical interfaces in a mounted state.
Figure 3B:
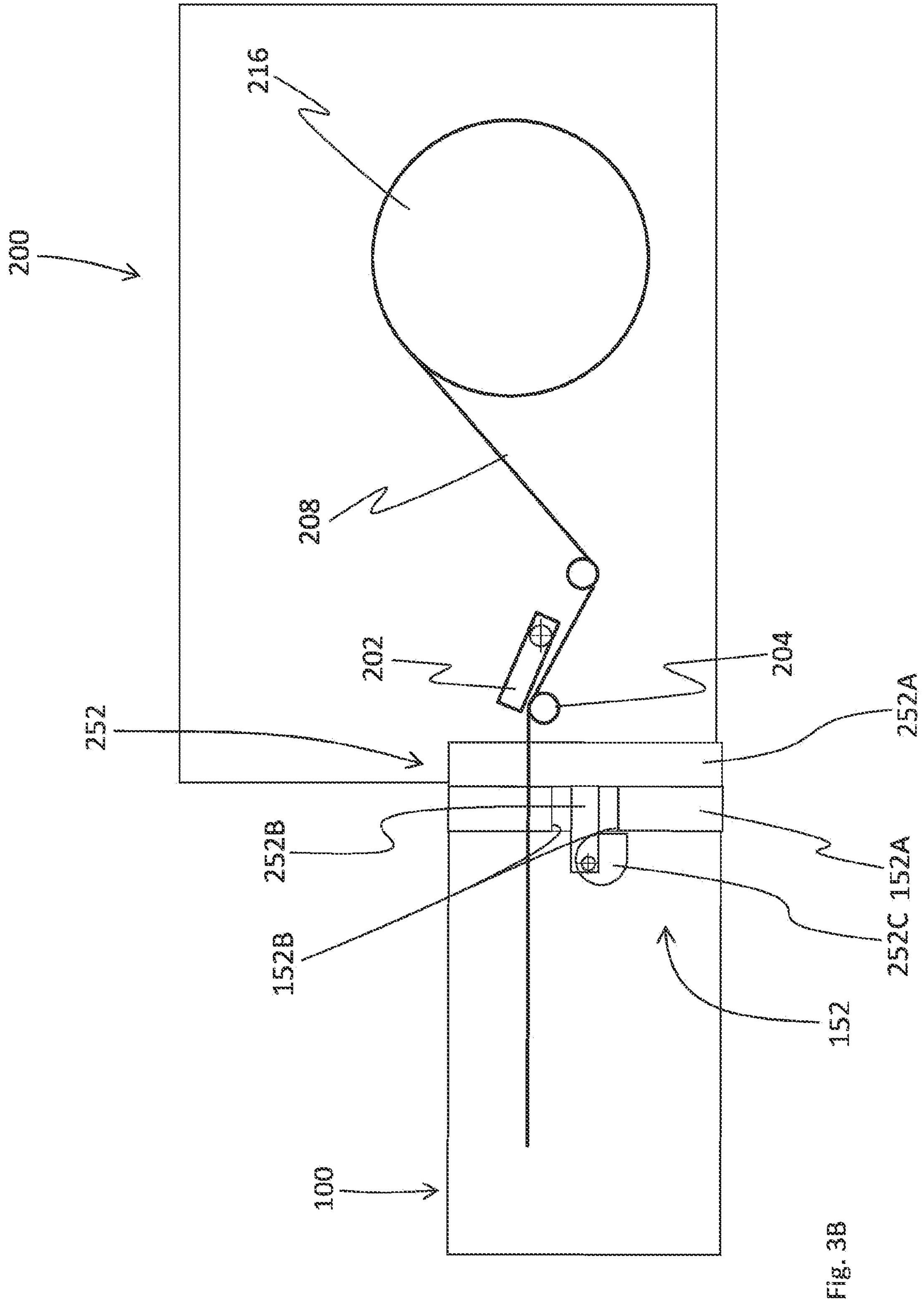
FIG. 3B a schematic sectional view of the device and printer with corresponding third embodiments of the mechanical interfaces in a released state.

FIGS. 3A and 3B schematically illustrate a cross-sectional view of the device 100 and the printer 200 with corresponding third embodiments of the mechanical interface 152 and the mechanical interface 252, respectively, which may be implementable on each embodiment of the device 100 and each embodiment of the printer 200, respectively.

The mechanical interface 152 of the device 100 comprises a flange 152A having at least one opening 152B. The mechanical interface 252 of the printer 200 comprises a plate 252A and at least one stud 252B immovably attached to the plate 252A and projecting (i.e., protruding) (preferably perpendicular to the plate). An eccentric 252C (which may also be referred to as a latch) is rotatably mounted on a free end of the (or each) stud 252B.

In the released state, the (or each) eccentric 252C is pluggable through the opening 152B (or one of the at least one opening, respectively) in the flange 152A.

For fastening, the stud 252B with the eccentric 252C plunges through the opening 152B in the released state, preferably until the flange 152A rests against or is in contact with the plate 252A. This is shown schematically in FIG. 3A.

Now the eccentric 252C may be rotated to the mounted state. This is shown schematically in FIG. 3B.

In the mounted state, the at least one stud 252B protrudes through the respective opening 152B of the flange 152A. The at least one eccentric 252C abuts the flange 152A on a side of the flange 152A facing away from the printer 200.

The at least one eccentric 252C is respectively mounted on the free end (i.e., the free-standing end) of the respective stay bolt 252B for eccentric rotational movement about an axis of rotation. In the released state, the eccentric 252C is in a first rotational position (for example, as shown schematically in FIG. 3A) and in the mounted state, it is in a second rotational position different from the first rotational position (for example, as shown schematically in FIG. 3B). Preferably, the axis of rotation of the eccentric 252C is parallel to the plate 252A and/or parallel to the flange 152A.

In the first rotational position, an extent of the eccentric 252C in any direction perpendicular to a longitudinal axis of the stud 252B is less than a transverse dimension of the opening 152B in the corresponding direction, so that the eccentric is pluggable through the opening 152B, i.e., fits through the opening 152B along the longitudinal axis of the stud 252B.

In contrast, in the second rotational position, a support surface of the eccentric 252C that is eccentric with respect to the axis of rotation of the eccentric protrudes beyond an edge of the respective opening 152B. Preferably, the support surface of the eccentric is in contact with the flange (for example, with the edge of the respective opening) in the mounted state. Because of this extension of the eccentric 252C perpendicular to the longitudinal axis of the stud 252B and perpendicular to the axis of rotation of the eccentric 252C, the eccentric is fixed on the side of the flange 152A facing away from the printer.

Any embodiment of a mechanical interface 152 and/or 252 comprising an element (for example, the latch, the slider, and/or the eccentric) for planar motion or partial rotation may be electromotively lockable (i.e., by means of another actuator of the device 100), for example, by an actuation at the user interface 209 of the printer and/or to securely complete an update of a firmware of the control unit or regulating unit 130 of the device 100.

Alternatively or additionally, the planar motion or partial rotation may be driven by an electric motor. For example, once the device 100 (for example, the applicator) is in position relative to the printer 200. Preferably, a limit switch or operator action (for example, at the user interface 209) may cause an actuator to perform the latching action.

Figure 4A:
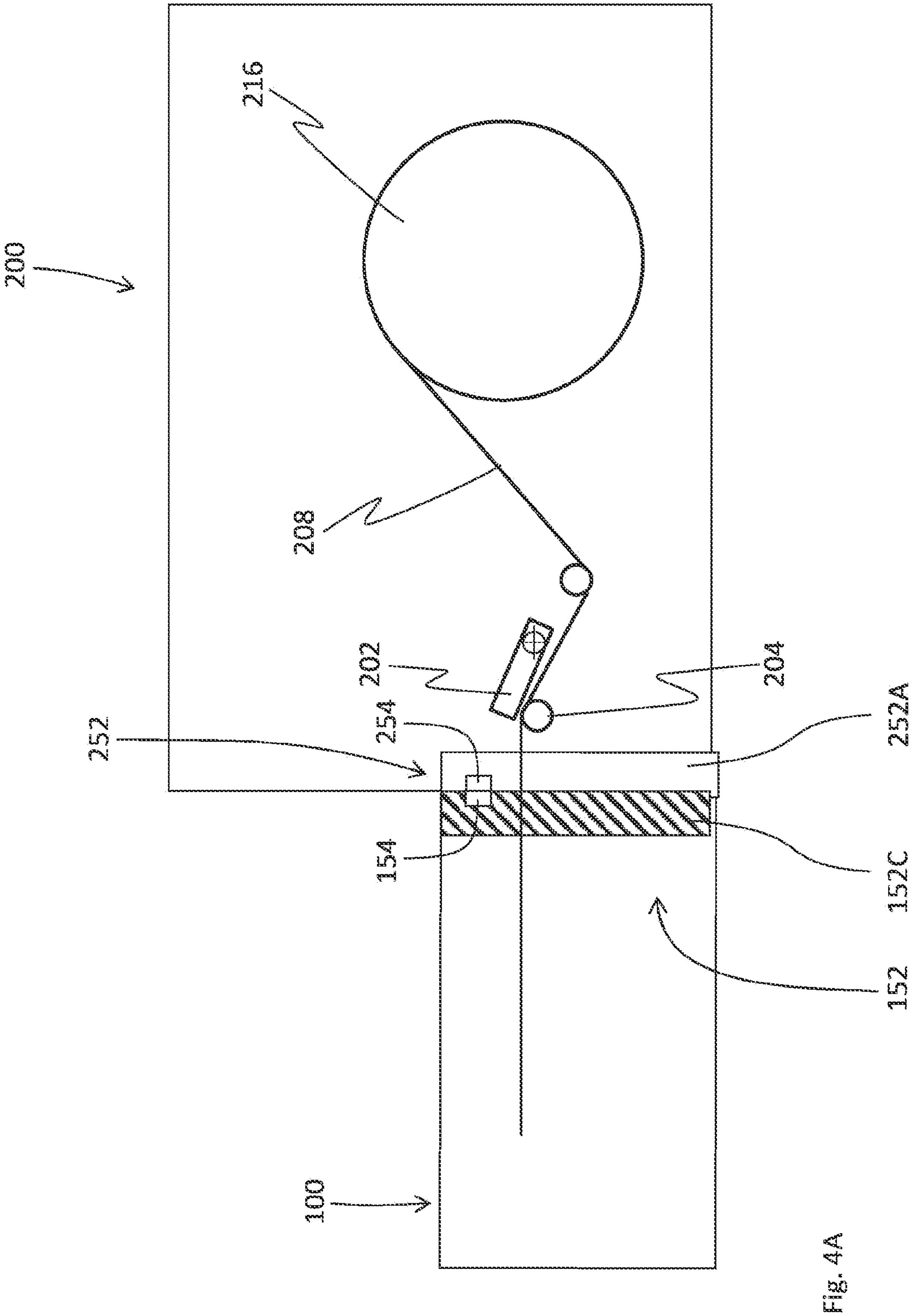
FIG. 4A a schematic sectional view of the device and printer with corresponding fourth embodiments of the mechanical interfaces.

FIG. 4A schematically illustrates a cross-sectional view of the device 100 and the printer 200 with corresponding fourth embodiments of the mechanical interface 152 and the mechanical interface 252, each of which may be implementable on any embodiment of the device 100 or any embodiment of the printer 200.

The plate 252A (for example, a flange) of the printer 200 is ferromagnetic, for example, made of a ferromagnetic metal or alloy.

In the device 100, an electromagnet 152C (preferably having a ferromagnetic core) is arranged at the mechanical interface 152. Preferably, magnetic north and south poles are arranged (for example, by means of corresponding pole shoes or pieces) on a surface of the mechanical interface 152. Preferably, field lines of a magnetic flux at the surface of the mechanical interface 152 are parallel or at least substantially parallel to the longitudinal direction 210.

The electromagnet 152C is activated by applying a current to the device 100 (for example, by contacting the electrical interface 154 with a corresponding electrical interface 254 of the printer 200). The interaction between the electromagnet 152C and the ferromagnetic plate 252A in the mounted state connects the device 100 to the printer 200 by force-locking.

Figure 4B:
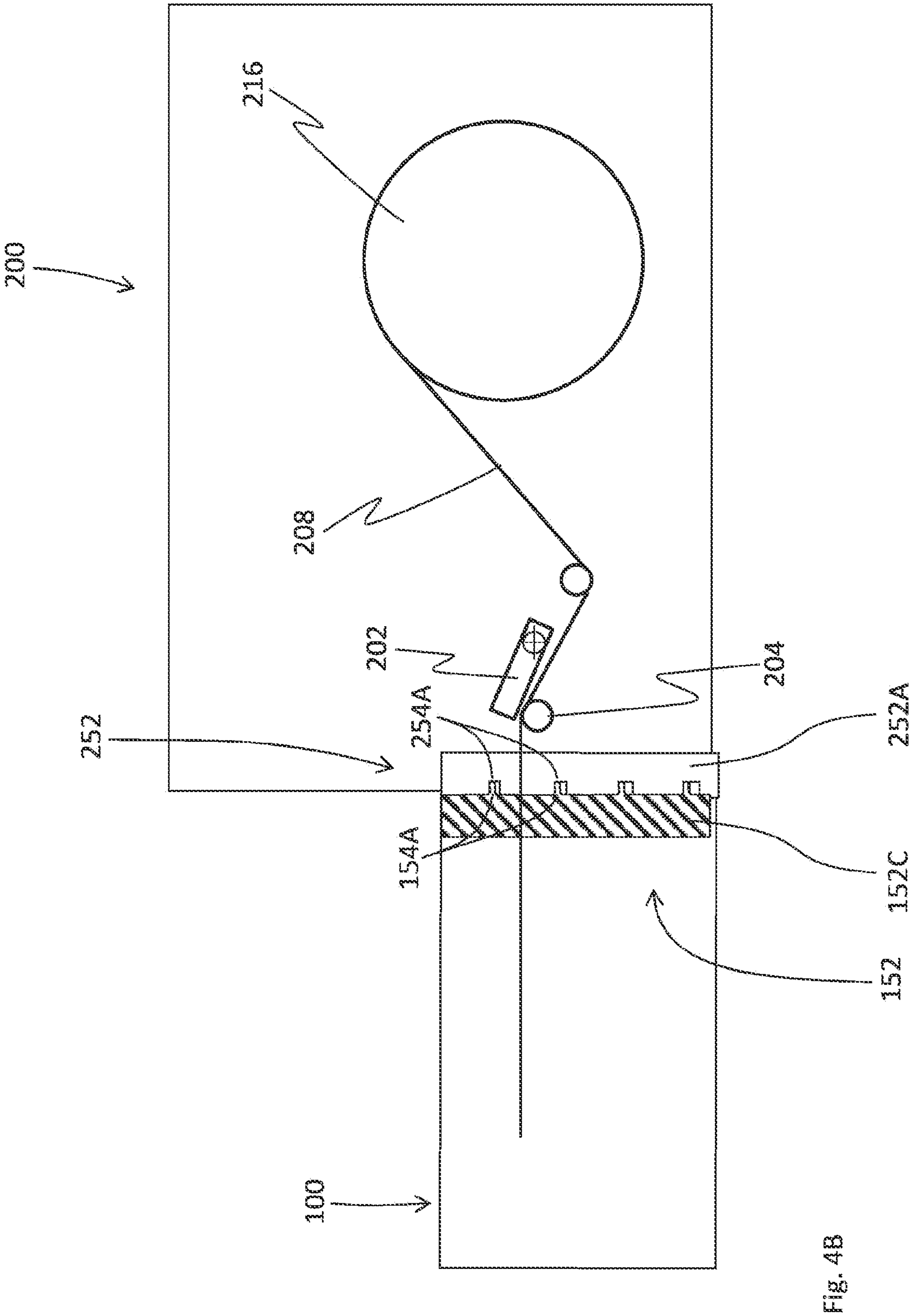
FIG. 4B a schematic sectional view of the device and printer with corresponding fifth embodiments of the mechanical interfaces.

FIG. 4B schematically shows a cross-sectional view of the device 100 and the printer 200 with corresponding fifth embodiments of the mechanical interface 152 and the mechanical interface 252, each of which may be implementable on any embodiment of the device 100 or any embodiment of the printer 200.

The fifth embodiment may be a further embodiment of the fourth embodiment. For example, one or more centering pins 154A are arranged between the poles or pole shoes of the electromagnet 152C, each of which is received in a centering bushing in the plate 252A of the mechanical interface 252 of the printer 200 for a positive-fit connection parallel to the plate 252A in the mounted state.

Preferably, the centering pins 154A comprise electrical contacts of the electrical interface 154 and/or the data interface 158 of the device 100. The centering sockets 254A may comprise electrical contacts of the electrical interface 254 and/or the data interface 258 of the printer 200. Thus, the mounted state may ensure electrical contact of the electrical interfaces and/or the data interfaces.

Figure 5:
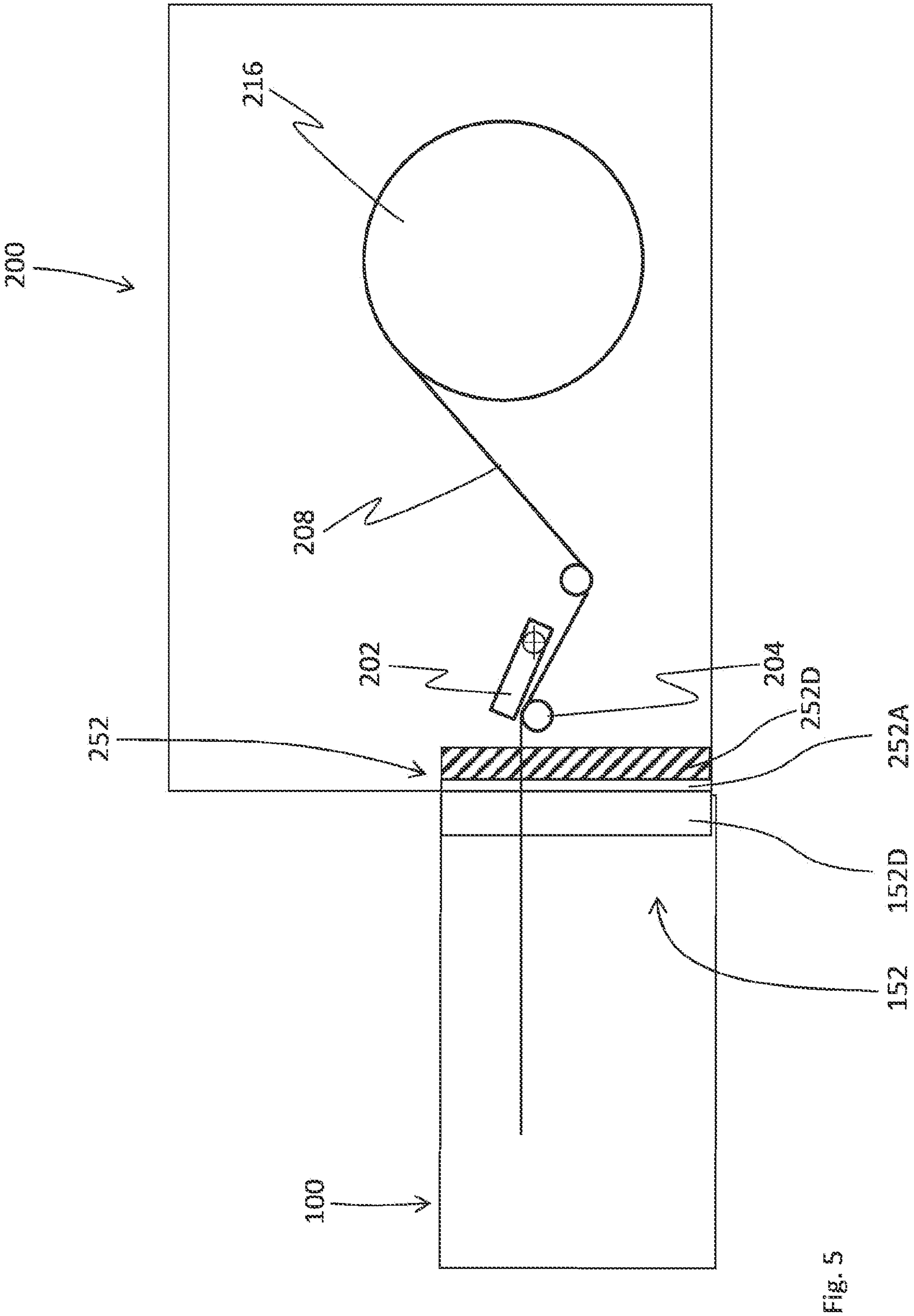
FIG. 5 a schematic sectional view of the device and printer with corresponding sixth embodiments of the mechanical interfaces.

FIG. 5 schematically illustrates a cross-sectional view of the device 100 and the printer 200 with corresponding sixth embodiments of the mechanical interface 152 and the mechanical interface 252, each of which may be implementable on any embodiment of the device 100 or any embodiment of the printer 200.

The mechanical interface 152 of the device 100 comprises a permanent magnet 152D. Preferably, its magnetic north and south poles are arranged on a surface of the mechanical interface 152. Preferably, field lines of a magnetic flux on the surface of the mechanical interface 152 are parallel or at least substantially parallel to the longitudinal direction 210, which interacts (preferably de-energized) with the ferromagnetic plate 252A of the device 100 in the mounted state.

The mechanical interface 252 of the printer 200 comprised an electromagnet 252D arranged to generate a second magnetic field for neutralizing the magnetic field of the permanent magnet (for example, at the location of the ferromagnetic plate 252A). This enables disassembly (i.e., the released state).

Figure 6:
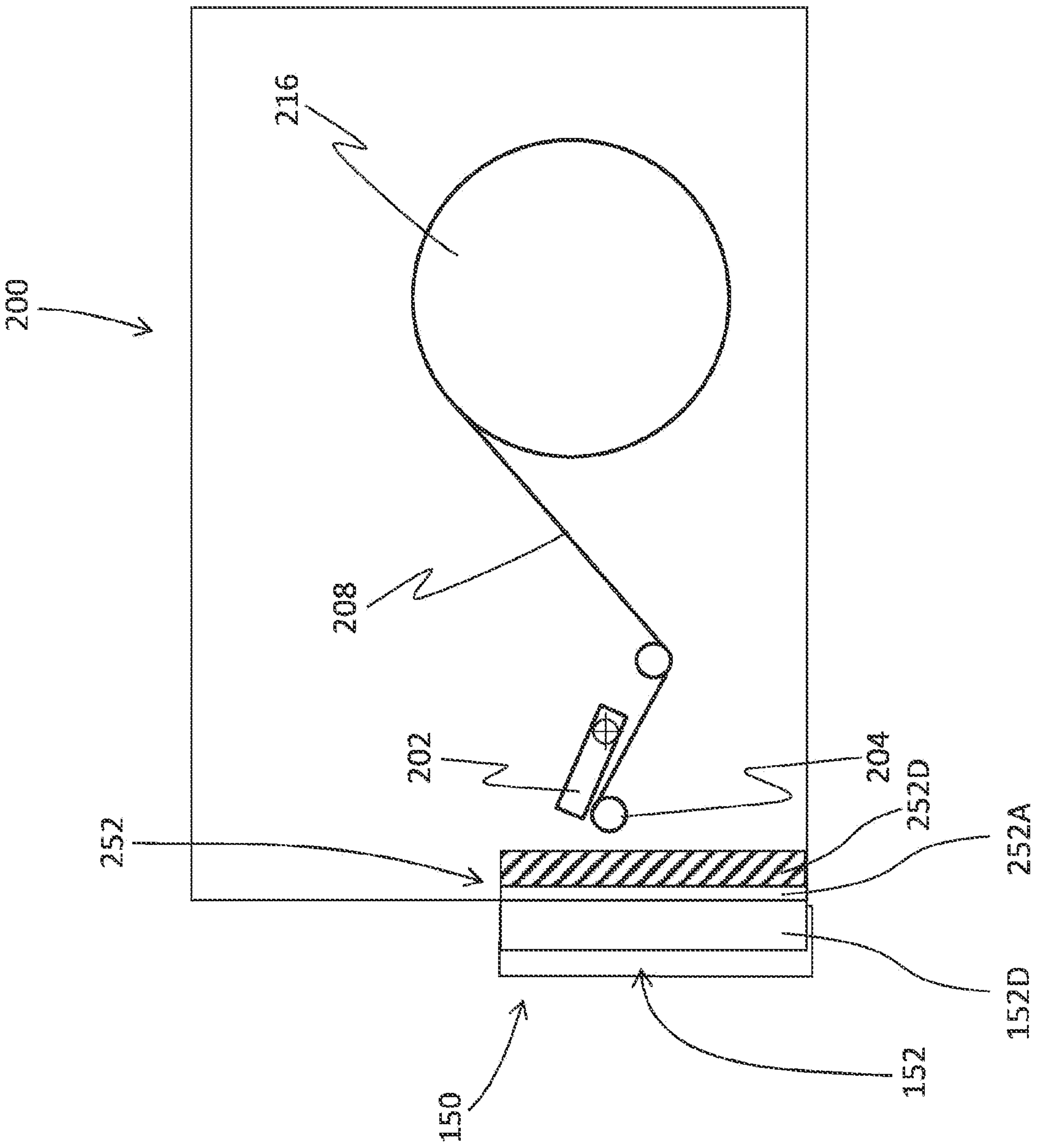
FIG. 6 a schematic sectional view of a cover and the printer with corresponding sixth embodiments of the mechanical interfaces.

Preferably, a cover 150 is provided in each embodiment of the printer 200 or printing system 100, 200. FIG. 6 illustrates an embodiment of a cover 150 for the sixth embodiment of the mechanical interfaces 152 and 252. This may have the advantage of not consuming power when the cover 150 remains in the mounted state for a long period of time.

The cover 150 comprises an embodiment of the mechanical interface 152 corresponding to the embodiment of the mechanical interface 252 of the printer. For example, the printing system comprises a device 100 and a cover 150, each having identical mechanical interfaces 152.

The cover 150 may be arranged in a mounted state on the printer when the printer 200 is transported, not in use, and/or in use as (for example, an application-unspecific label printer), for example, as described generally or for each embodiment of the mechanical interfaces. For example, the cover 150 is attached to the printer utilizing the quick release technology of the mechanical interfaces 152 and 252.

The attached cover 150 covers the mechanical interface 252. Preferably, the material interface 256 of the printer 200 remains open to output the printed material 214.

Figure 7:
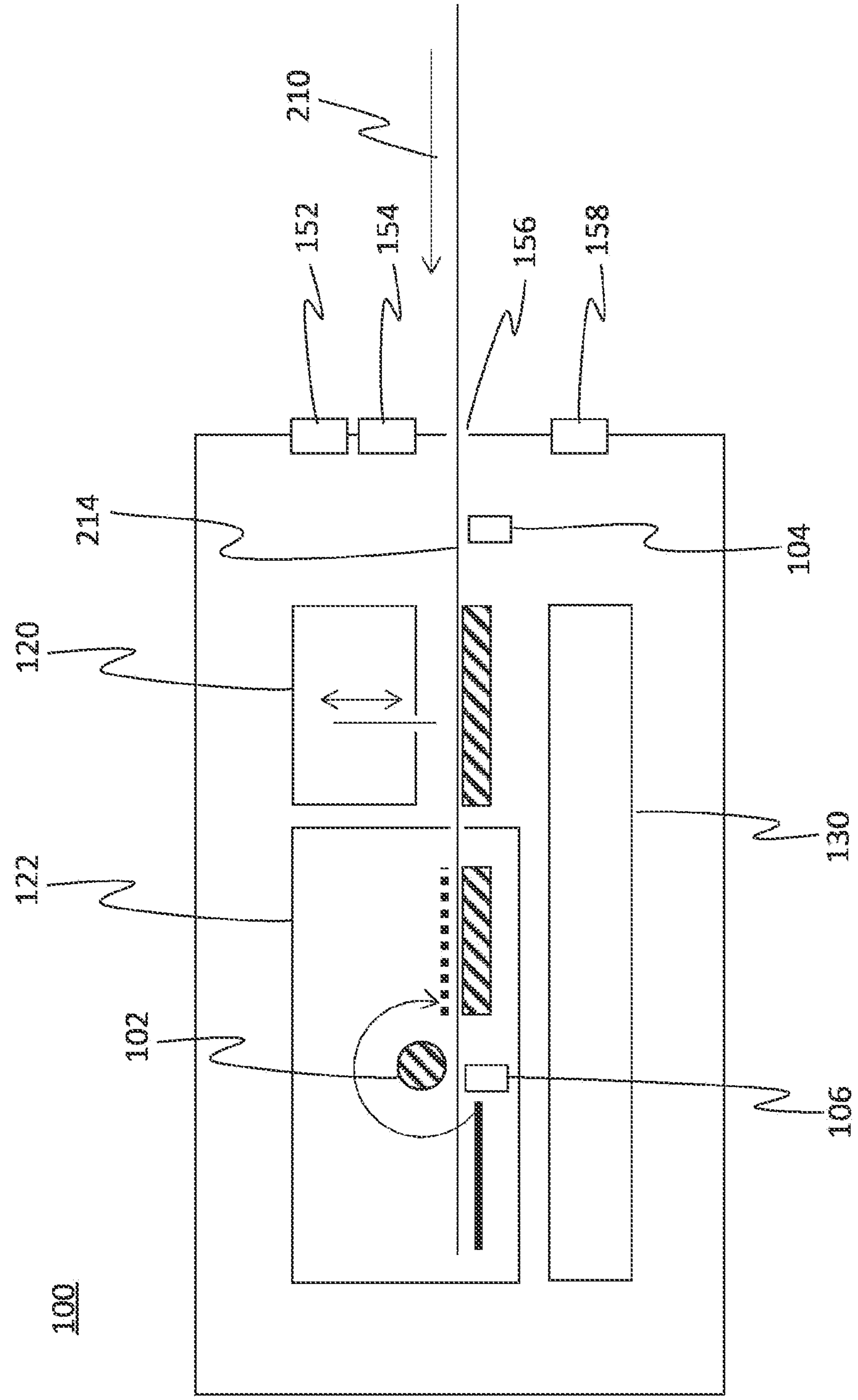
FIG. 7 a schematic sectional view of a second embodiment of the device for providing a marking in a first state.
Figure 8A:
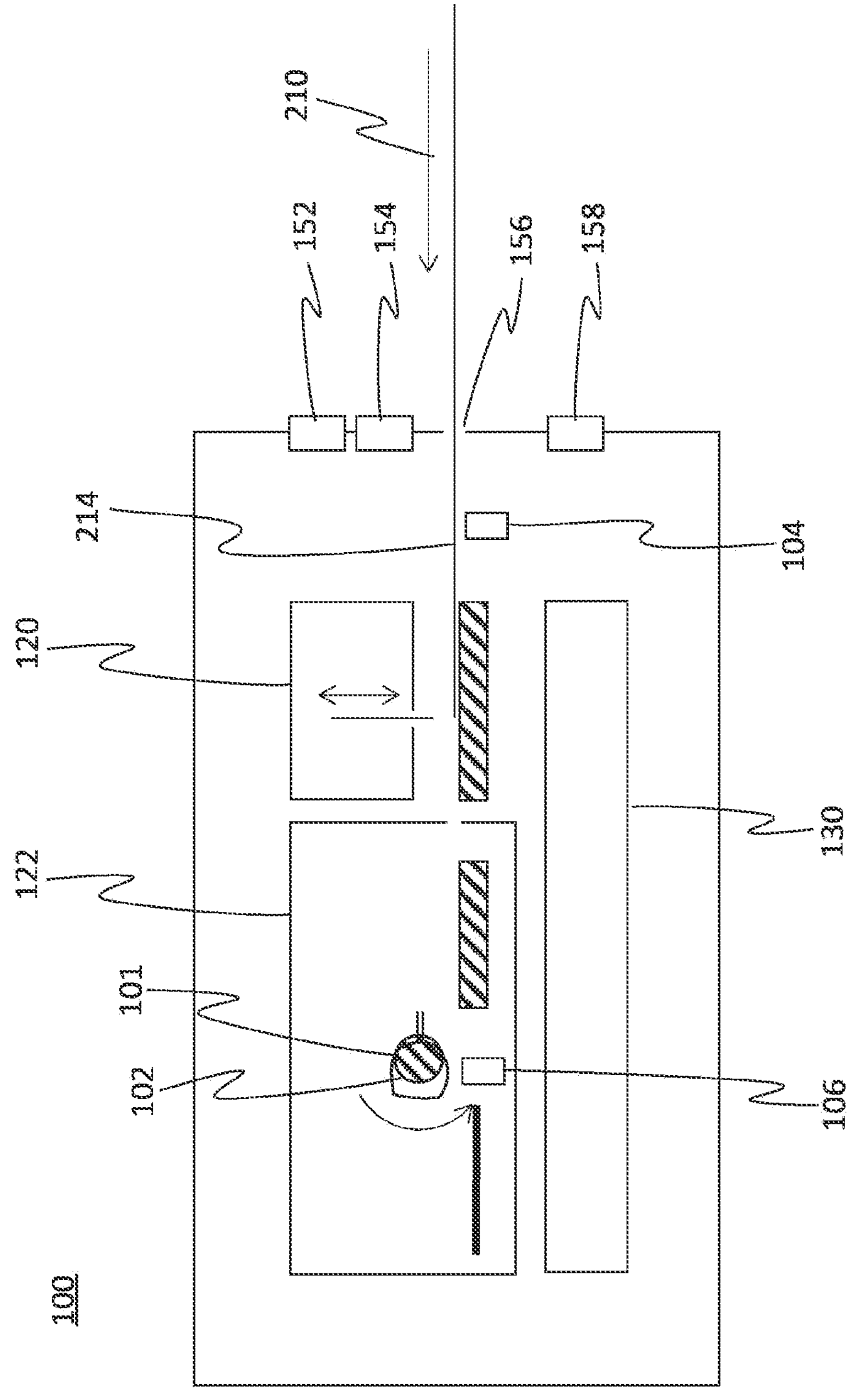
FIG. 8A a schematic sectional view of a second embodiment of the device for providing a marking in a second state.

FIGS. 7 and 8A show a schematic sectional view of a second embodiment of the applicator 100 (i.e., the device 100 for applying) a printed marking in a first state and a second state of application, respectively.

The second embodiment of the applicator 100 may be implemented independently or in further embodiment of the first embodiment of the applicator 100. Features of the first and second embodiments of the applicator 100, denoted by the same reference numerals, may be the same or interchangeable.

The second embodiment of the applicator 100 is configured to strike or fold a printed film as a printed product 214 around the conductor 102 by means of a second actuator 122 of the applicator 100. Preferably, the sensor 106 determines the diameter of the conductor 102. The control unit 130 calculates a length from the diameter and controls the printer (more precisely: its printing roller 204) via the data interface 158 to feed the printed product 214 according to the determined length.

After the feed, for example in the first state shown in FIG. 1, the printer 200 reports via the data interface 258 (i.e., to the data interface 158) that the feed has been successfully completed, for example that the determined length has been reached. In response to the message from the printer 200, the control unit 130 controls the actuator 122 to wrap or fold the printed product 214 around the conductor 102. Further, the second actuator 122 (or, in one embodiment, a further actuator) is configured to heat weld together sections of the printed product 214 that lie flat on top of each other. Preferably, a first actuator 120 of the applicator cuts the welded sections to a flush end of the marking 101.

In a first variation of the second embodiment of the applicator 100, a portion of the surface surrounding the conductor 102 is printed and the flush cut end is short compared to the circumference of the conductor 102. Preferably, the applying, i.e., a step of the procedure control of the applicator 100, comprises two embossments performed on the printed product before and after the printed portion by means of the actuator 120, as schematically shown in FIG. 8A.

For example, the procedure control of the applicator 100 may comprise at least one of the following operations or steps. In one step, a control command is sent from the control unit 130 to the printer 200. The control command specifies the feed rate of the printed product 214 for a reference cut. In another step, in response to a notification of completion of the feed from the printer 200 to the applicator 100, the reference cut is executed by the actuator 120. A further step of the procedure control of the applicator 100 may comprise waiting until the presence of the conductor 102 is detected or acquired by means of the sensor 106. Another step of the procedure control (i.e., the procedure control sequence) of the applicator 100 may comprise acquiring the diameter of the conductor 102 by means of the sensor 106 and calculating parameters of the applying (for example, partial lengths for feeds of the printed product 214).

In a further step, a further control command is sent from the control unit 130 to the printer 200. The further control command specifies a first partial feed of the printed product 214 for a first embossing. In a further step, in response to a notification of completion of the first partial feed from the printer 200 to the applicator 100, the first embossing is performed by the actuator 120.

In a further step, a further control command is sent from the control unit 130 to the printer 200. The further control command specifies a second partial feed of the printed product 214 for a second embossing. In a further step, in response to a notification of completion of the second partial feed from the printer 200 to the applicator 100, the second embossing is performed by the actuator 120.

In a further step, a control command is sent from the control unit 130 to the printer 200 indicating a partial feed of the printed product 214 for a cutting position. In a further step, in response to a notification of completion of the partial feed for the cutting position from the printer 200 to the applicator 100, the cut is performed by the actuator 122, the printed product is wrapped or folded around the conductor 102, sealing portions of the printed product 214 brought into flat contact with each other, and a cut performed by the actuator 120.

Figure 8B:
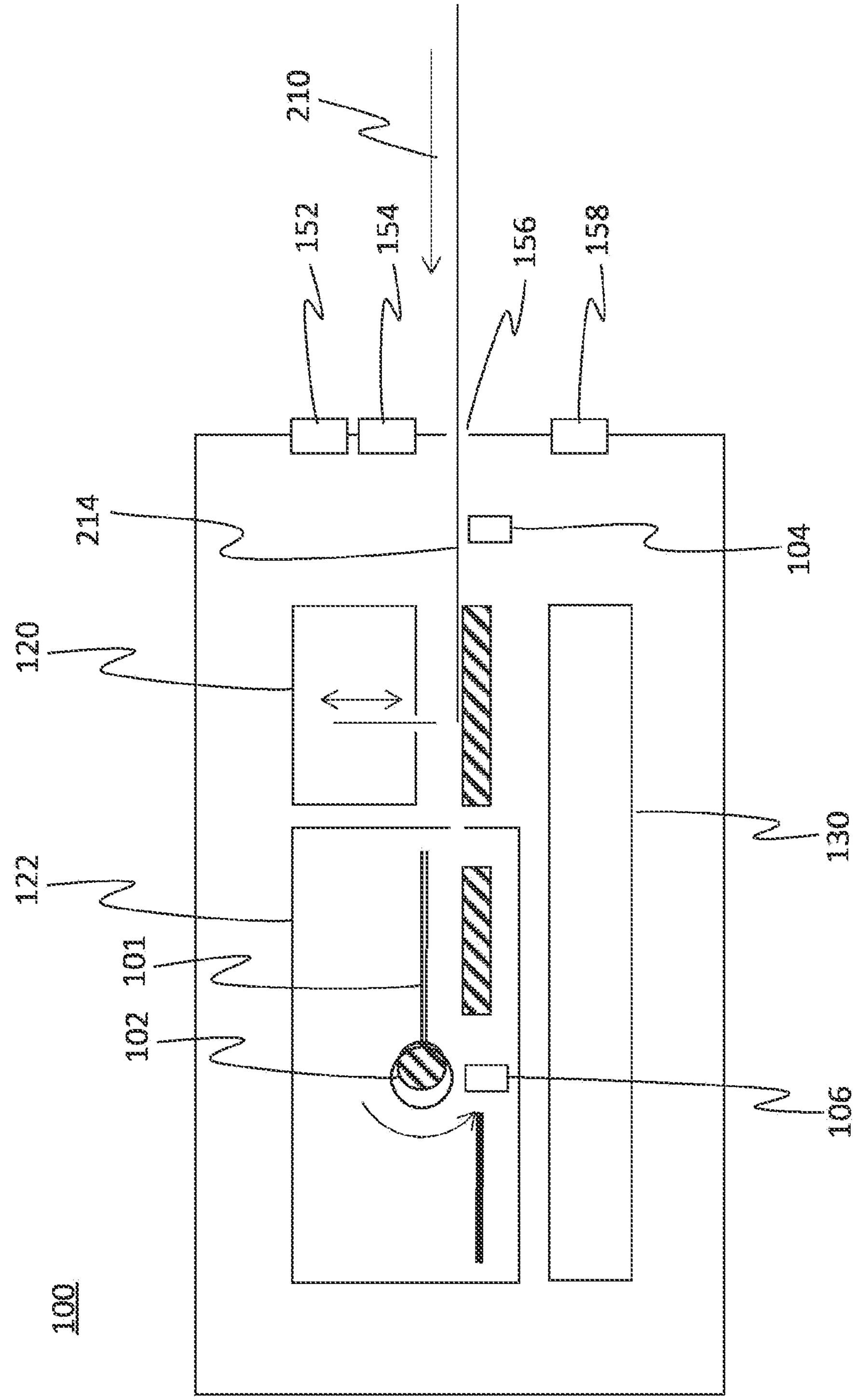
FIG. 8B a schematic sectional view of a variant of the second embodiment of the device for providing a marking in a second state.

In a second variation of the second embodiment of the applicator 100, the flush cut end is equal to or longer than the diameter of the conductor 102 and comprises the printed portion of the printed product 214, as shown schematically in FIG. 8B.

Figure 9:
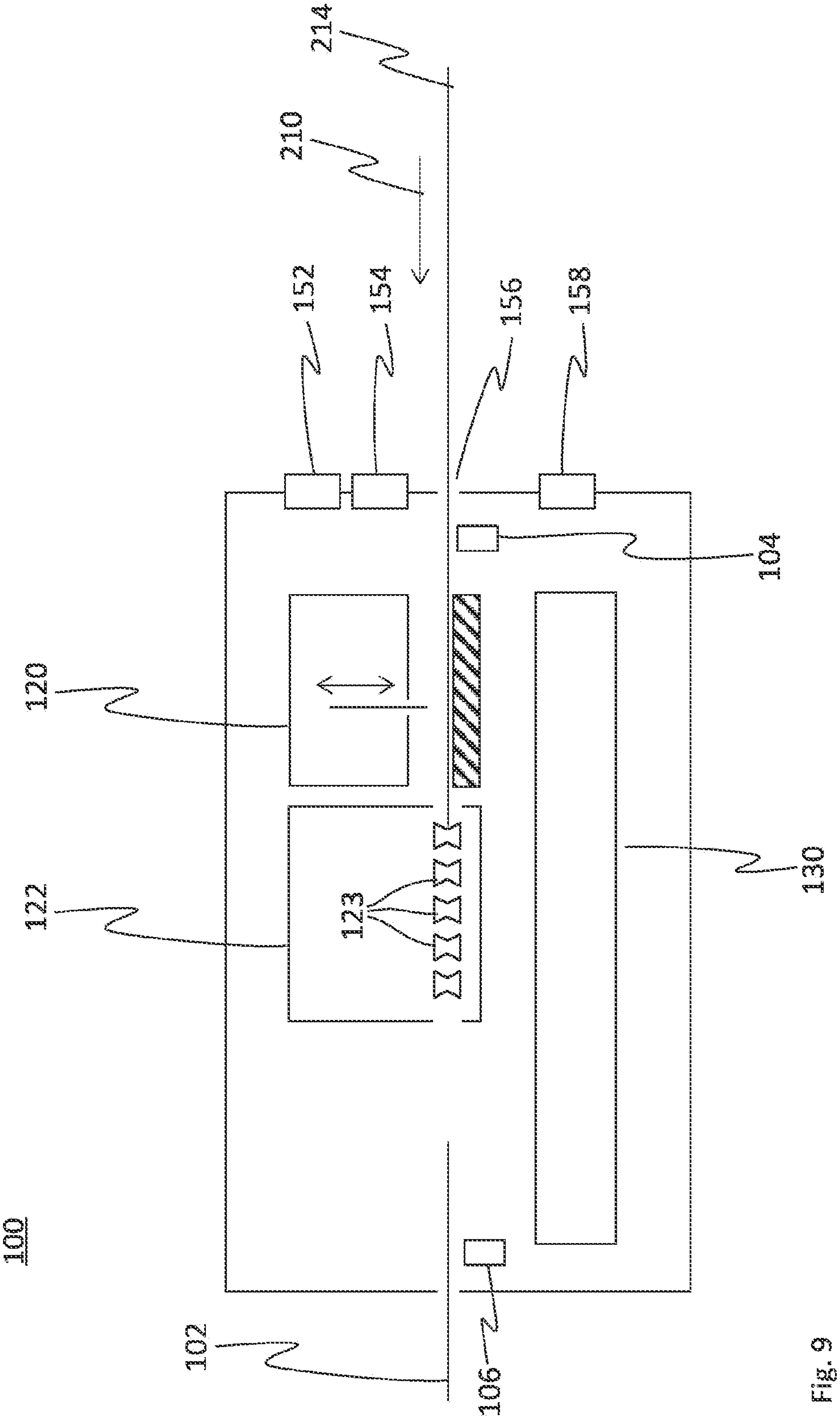
FIG. 9 a schematic sectional view of a third embodiment of a device for providing a marking in a first state.
Figure 10:
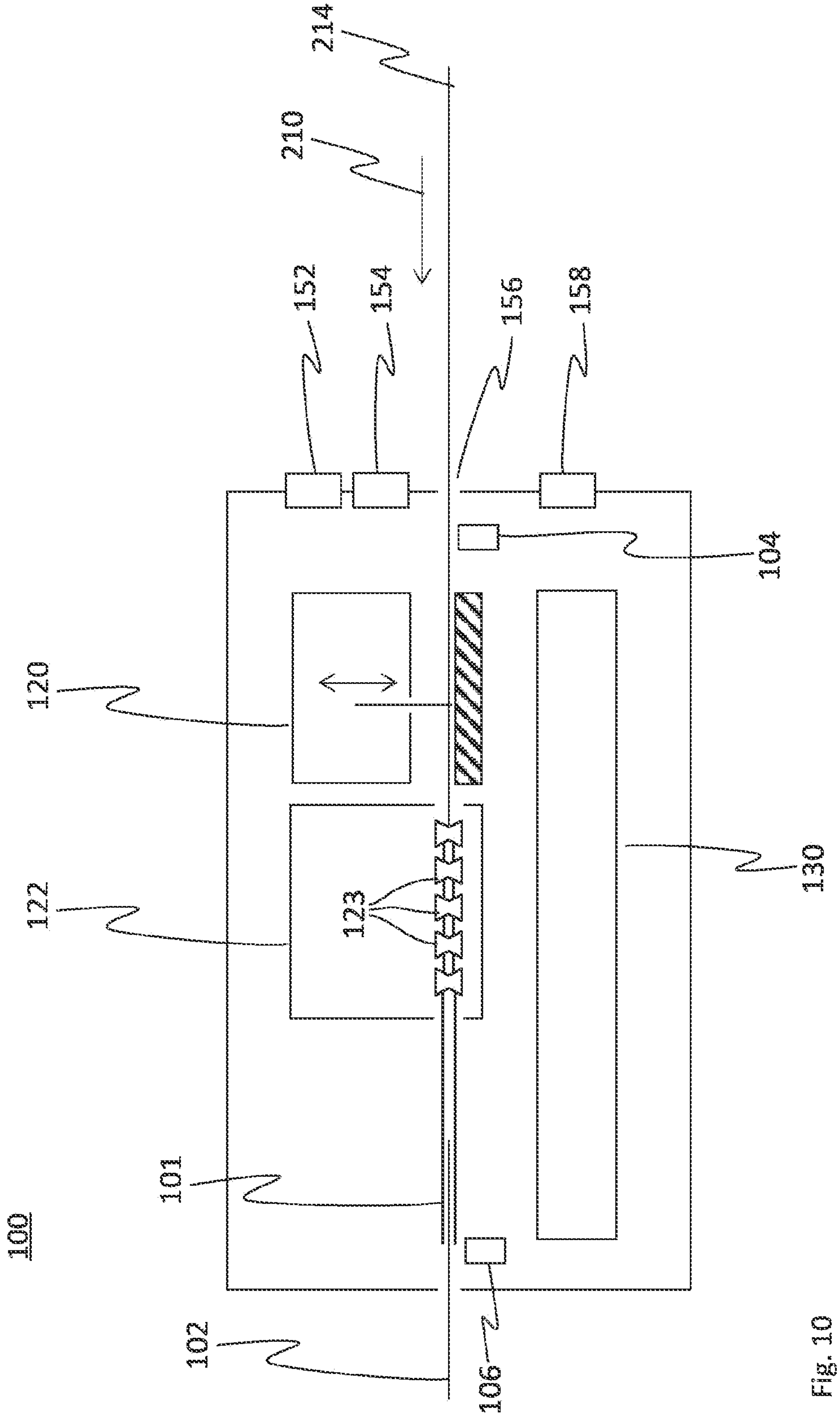
FIG. 10 a schematic sectional view of a third embodiment of a device for providing a marking in a second state.

FIGS. 9 and 10 show a schematic sectional view of a third embodiment of the applicator 100, i.e., the device 100 for applying a printed marking in a first state and a second state of the application, respectively.

The third embodiment of the applicator 100 may be implemented independently or in further embodiment of the first embodiment and/or the second embodiment of the applicator 100. Features of the first, second, and third embodiments of the applicator 100 designated by the same reference numerals may be the same or interchangeable.

The third embodiment of the applicator 100 is configured to slide or attach a tube (for example, a heat-shrink tube) as a printing medium 208 or a printed tube as a printed product 214 to the conductor 102. When the tube is printed and/or cut (for example, by means of the first actuator 120 of the applicator), the tube is pressed flat, whereby its cut end or at least a section of the printed tube may be closed, i.e., the cut edge or the inner sides of the tube adhere to each other.

The second actuator 122 (also: opening unit) is configured to open the cut edge of the printed tube adhering together and/or the inner sides (for example, an upper tube half and a lower tube half) of the printed tube adhering together. To this end, the second actuator 122 comprises waisted rollers 123 that apply a force in pairs to opposite lateral edges of the printed tube 214 to open the cut edge of the tube and/or to release the inner sides of the tube from each other. In the schematic illustration of FIGS. 9 and 10, one of each pair of oppositely disposed rollers 123 is visible as the pairs are aligned perpendicular to the longitudinal direction or direction of movement 210.

In the second state shown in FIG. 10, the printed tube is opened by means of the second actuator 122, pushed onto the conductor as a marking 101 due to a feed of the printer 200, and cut off at the end by means of the first actuator 120.

Figure 11:
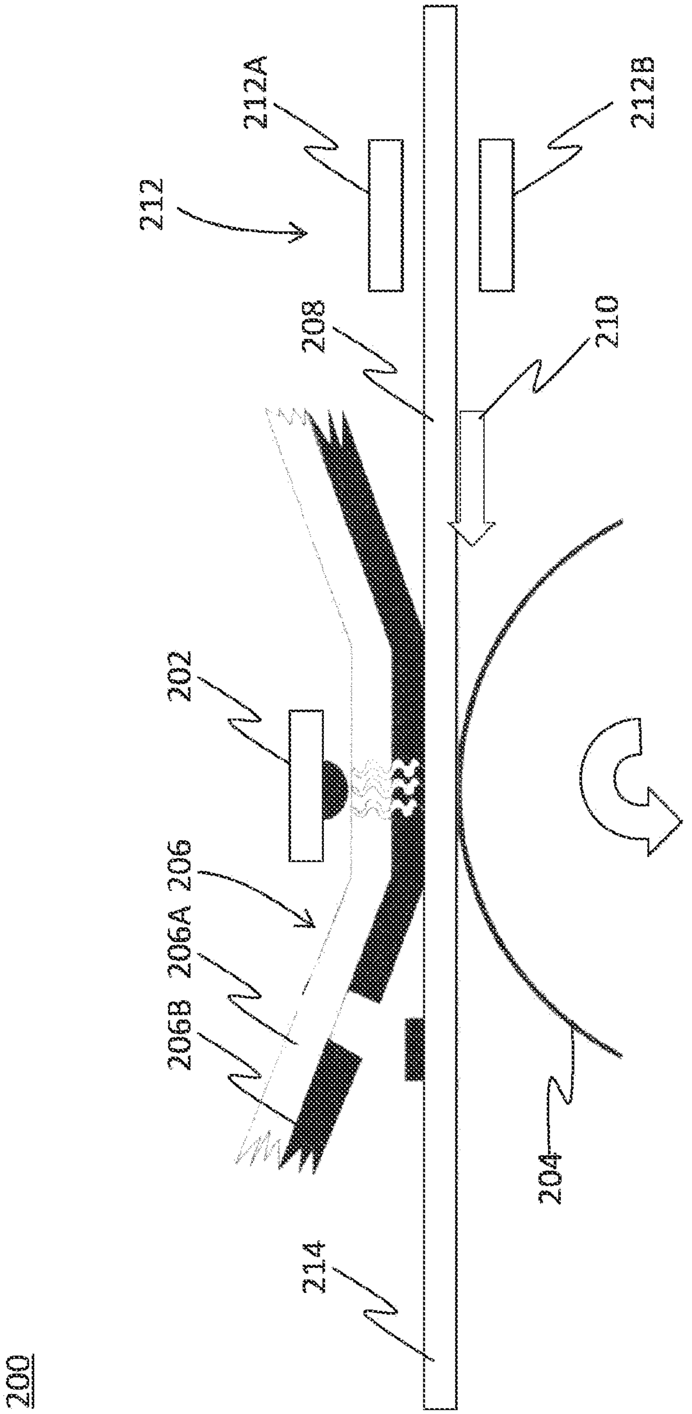
FIG. 11 a schematic sectional view of an embodiment of a printer as a thermal transfer printer.

FIG. 11 shows a further embodiment of the printer 200, which may be implemented independently or as a further development of the embodiment of the printer 200 described in the context of FIG. 1. Features of the embodiments designated by the same reference numerals may be identical or interchangeable. The further embodiment of the printer 200 is an example of a thermal transfer roll printer.

A control unit 230 of the printer 200 controls a feed and/or a retraction of the print medium 208 at the print head 202 and/or of the printed product 214 at the material interface 256 (and consequently at the material interface 156 of the device 100), depending on the signals of the photoelectric sensor 212 and/or control commands obtained from the device 100 via the data interface 258 (i.e., via the data interface 158 of the device 100). For this purpose, the control unit 230 may control a drive (for example, a stepper motor) for rotating the print roller 204.

The light barrier 212 may be arranged, with respect to a direction of movement 210 of the print medium 208 during feed, upstream of the print head 202 and/or the print roller 204. The light barrier 212 may comprise, as exemplarily shown in FIG. 11, a light source 212A on the side of the print head 202 and a light sensor 212B on the side of the print roller 204. In a first variation, the positions of light source 212A and light sensor 212B may be interchanged. In a second variation, light source 212A and light sensor 212B may be arranged on the same side for detecting the print medium 208 in reflection.

The printhead 202 comprises a plurality of heating elements. When the heating elements are heated (for example, energized) and the print roller 204 applies a predetermined (for example, sufficiently large) pressure to the print medium 208, the ink pigments are transferred from the print material 206 (for example, an ink ribbon) to the material to be printed. The control unit 230 may control the stepper motor to rotate the print roller 204 and control the energization of the heating elements of the print head 202.

The printing material 206 may comprise a plurality of layers. For example, the printing material 206 may comprise a carrier material 206A (for example, a carrier film) facing away from the printing medium 208 and a color layer 206B (for example, a color wax) facing toward the printing medium 208.

The printer 200 is preferably a tabletop device to which the device 100 may be attached as a replaceable or interchangeable module, for example, specific to an application or for the duration of a uniform application process.

Figure 12A:
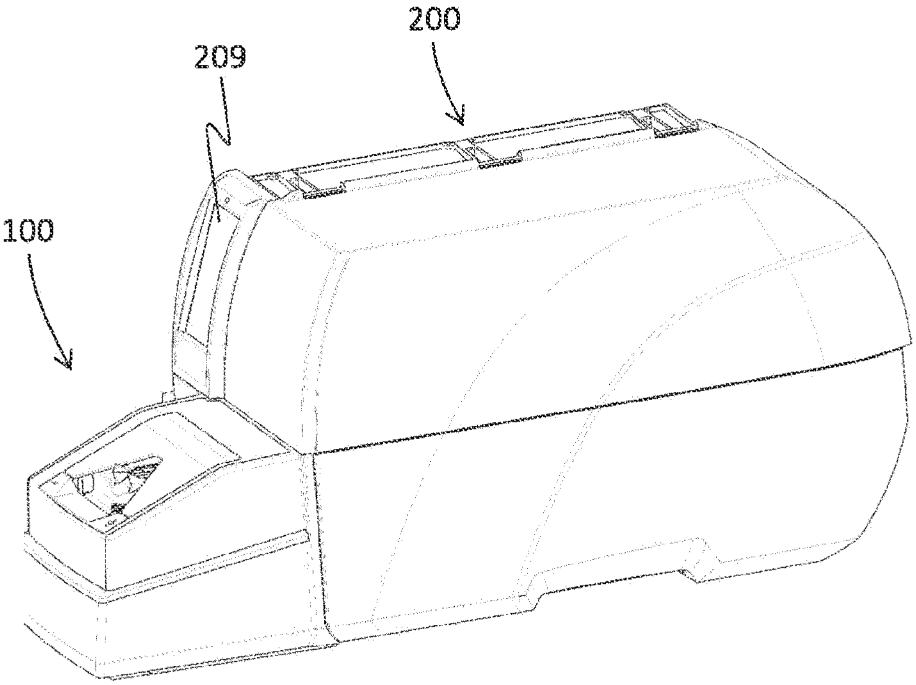
FIG. 12A a schematic perspective view of an exemplary printing system comprising an embodiment of the printer and an embodiment of the device for providing a marking, in a mounted position.
Figure 12B:
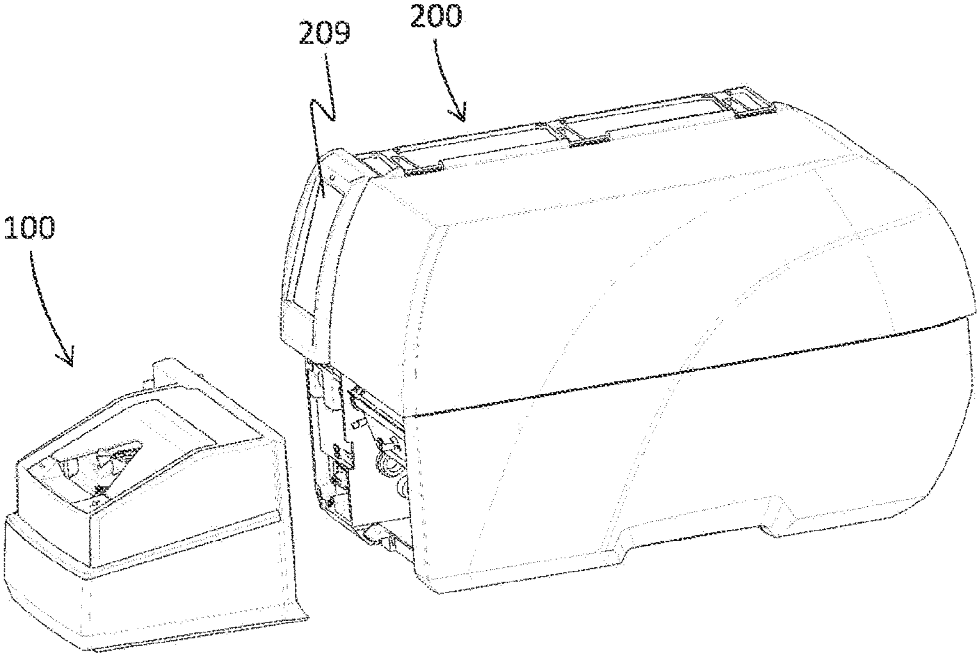
FIG. 12B a schematic perspective view of the exemplary printing system of FIG. 12A in a disassembled position.

FIG. 12A shows a schematic perspective view of an exemplary printing system (system for short) comprising an embodiment of the printer 200 and an embodiment of the device 100. In an exemplary mounted position of the device shown in FIG. 12A, all implemented physical interfaces are connected due to the arrangement of the device 100 on the printer 200. FIG. 12B shows a schematic perspective view of the exemplary printing system of FIG. 12A in a disassembled position. The physical interfaces are exposed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

- Device for providing a marking, for example applicator 100
- Marking 101
- Prolates object, preferably conductor, for example copper conductor or light guide 102
- Print signal interface of a control signal for outputting the printed product, for example sensor for detecting the printed product 104
- Sensor of a control signal for providing a marking, for example, sensor for detecting the object, or sensor for acquiring a provisioning request 106
- First actuator of the device, for example cutting unit 120
- Transverse direction 121
- Second actuator of the device 122
- Waisted roller of the second actuator 123
- Control unit or regulating unit of the device 130
- Cover cap 150
- Mechanical interface of the device 152
- Connection surface, preferably flange, of the mechanical interface 152A
- Opening in the flange 152B
- Electromagnet of the mechanical interface 152C
- Permanent magnet of the mechanical interface 152D
- Slider, for example longitudinal or rotary slider 153
- Recess in the slider 153A
- Handle strip, preferably also stop 153B
- Opening at convex edge of the connection surface 153C
- Edge of the opening 153D
- Electrical interface of the device 154
- Centering pin, preferably with electrical interface 154A
- Material interface of the device 156
- Data interface of the device 158
- Printer, for example thermal transfer printer 200
- Print head of the printer 202
- Print roller of the printer 204
- Printing material, for example color ribbon 206

Carrier material of the printing material, for example carrier foil 206A
Color layer of the printing material, e.g. color wax 206B
Printing medium of the printer (also: printing material) 208
Display, preferably user interface, of the printer 209
Feed direction or longitudinal direction of the print medium 210
Light barrier of the printer 212
Light source of the light barrier 212A
Light sensor of the light barrier 212B
Printed product of the printer 214
Unroller of the printing medium 216
Unroller of the printing material 218
Rewinder of the printing material 220
Data interface of the printer 222
Control unit of the printer 230
Mechanical interface of the printer 252
Plate of the mechanical interface, preferably ferromagnetic 252A
Stud of the mechanical interface 252B
Eccentric of the mechanical interface 252C
Electromagnet of the mechanical interface 252D
Undercut, preferably circumferential groove, of the stud 253
Electrical interface of the printer 254
Centering bushing, preferably with electrical interface 254A
Material interface of the printer 256
Data interface of the printer 258
Computer or computer network 300

The invention claimed is:

1. A printing system, comprising:
a printer configured to output a printed product; and
a device configured to provide a marking arranged or arrangeable in a closed circumferential manner around a prolate object,
wherein the device comprises a mechanical interface and the printer comprises a mechanical interface, which are positively and/or by force-locking connected in a mounted state and which are configured to release the positive and/or force-locked connection by a planar motion, a partial rotation and/or a current change to a released state, and
wherein the device further comprises:
a material interface configured to receive printed material output by the printer in the mounted state of the device, and
at least one actuator configured to arrange the marking on the prolate object in a circumferentially closed manner by the printed product output by the printer or to provide the marking for circumferentially closed arrangement in the mounted state of the device.

2. The printing system of claim 1, further comprising:
a clamping screw configured to secure the mounted state, eliminate mechanical backlash in the mounted state, and/or connect the mechanical interfaces by force-locking in the mounted state.

3. The printing system of claim 1, wherein the planar motion comprises a linear motion or a rotation.

4. The printing system of claim 1, wherein the partial rotation comprises a rotational or helical motion of less than 360°.

5. The printing system of claim 1, wherein the printer is configured to output the printed product in a longitudinal direction, and
wherein the mechanical interfaces are positively and/or by force-locking connected in a longitudinal direction in the mounted state.

6. The printing system of claim 1, wherein one of the mechanical interfaces comprises a latch which is movably mounted for planar motion and/or partial rotation between the mounted state and the released state.

7. The printing system of claim 1, wherein the mechanical interface of the printer comprises:
a plate; and
at least one stud projecting from the plate and having an undercut at a free end thereof.

8. The printing system of claim 7, wherein the mechanical interface of the device comprises:
a connection surface having an opening, and
a slider movable in the opening parallel to the connection surface and having a recess,
wherein, during transitioning from the released to the mounted state, the connection surface abuts the plate and the planar motion or partial rotation of the slider engages the recess with the undercut.

9. The printing system of claim 8, wherein the planar motion of the slider parallel to the interface comprises a linear motion and the recess comprises a longitudinal slot, or
wherein the planar motion of the slider parallel to the interface comprises a rotational motion and the recess corresponds to a circular arc.

10. The printing system of claim 7, wherein the mechanical interface of the device comprises:
a connection surface,
a handle strip on a side of the connection interface facing away from the printer, the handle strip being rotatably movable parallel to the interface, and
on a side of the connecting surface facing the printer, a slider with a recess, which slider is rotatably movable parallel to the connecting surface and is coupled to the handle strip in a rotationally fixed manner,
wherein, during the transition from the released to the mounted state, the connection surface abuts the plate and the rotational motion of the handle strip engages the recess with the undercut.

11. The printing system of claim 1, wherein the mechanical interface of the device comprises a flange having at least one aperture, and
wherein the mechanical interface of the printer comprises:
a plate; and
at least one stud projecting from the plate, each stud of the at least one stud having a latch rotatably supported at a free end thereof,
wherein, in the released state, the at least one latch is pluggable through a respective one of the at least one opening in the flange, and
wherein, in the mounted state, the flange abuts the plate and/or the at least one stud bolt protrudes through the respective opening in the flange and/or the at least one latch abuts a side of the flange facing away from the printer.

12. The printing system of claim 11, wherein the at least one latch is mounted pivotally about a longitudinal axis of the stud and has, parallel to the connection surface, a first transverse dimension and a second transverse dimension perpendicular to the first transverse dimension that is greater than the first transverse dimension,
wherein the respective opening of the connection surface has a first transverse dimension greater than the first transverse dimension of the latch and less than the second transverse dimension of the latch, and wherein the respective opening of the connection interface further has a second transverse dimension perpendicular to the first transverse dimension of the opening that is greater than the first transverse dimension of the opening and/or greater than the second transverse dimension of the latch.

13. The printing system of claim 11, wherein the at least one latch is an eccentric rotatably mounted about an axis of rotation, the eccentric being in a first rotational position in the released state and being in a second rotational position different from the first rotational position in the mounted state.

14. The printing system of claim 13, wherein the axis of rotation is parallel to the plate and/or parallel to the flange.

15. The printing system of claim 13, wherein in the first rotational position an extent of the eccentric in each direction perpendicular to a longitudinal axis of the stud is smaller than a transverse dimension of the opening in the respective direction, and/or wherein, in the second rotational position, a contact surface of the eccentric that is eccentric with respect to the rotational axis extends beyond an edge of the respective opening and/or abuts an edge of the respective opening.

16. The printing system of claim 6, wherein the latch, the slider, or the eccentric is wedge-shaped.

17. The printing system of claim 1, wherein the planar motion or partial rotation, the latch, and/or the eccentric, is electromechanically driven by an actuator of the device.

18. The printing system of claim 1, wherein the mechanical interface of the printer comprises a ferromagnetic plate and the mechanical interface of the device comprises an electromagnet configured to induce magnetic flux through the ferromagnetic plate in the mounted state and to reduce or neutralize it in the released state.

19. The printing system of claim 1, wherein the mechanical interface of the device comprises a permanent magnet, wherein the mechanical interface of the printer comprises an electromagnet and a ferromagnetic plate disposed between the permanent magnet and the electromagnet, wherein the permanent magnet is configured to induce magnetic flux through the ferromagnetic plate in the mounted state, and wherein the electromagnet is configured to reduce or neutralize the magnetic flux through the ferromagnetic plate in the released state.

20. The printing system of claim 17, wherein the actuator is configured to or controlled to drive the planar motion or partial rotation to the mounted state, and/or wherein the electromagnet is configured to or controlled to establish the magnetic connection in the mounted state in response to a sensing of the device by a sensor on the printer, a user input at a user interface of the printer, a voltage supplied by the printer at an electrical interface of the device, and/or an initial data exchange at a data interface of the device.

21. The printing system of claim 1, further comprising:

a cover which comprises a mechanical interface, wherein the mechanical interface of the cover and the mechanical interface of the printer are positively and/or by force-locking, preferably magnetically, connected in a mounted state.

22. The printing system of claim 21, wherein in the mounted state the cover covers at least the mechanical interface of the printer, preferably wherein, in the mounted state of the cover, the material interface is open for dispensing the printed material.

23. The printing system of claim 1, wherein the device further comprises:

a print signal interface configured to acquire a control signal of the outputting of the printed product; and/or at least one sensor configured to acquire a control signal of the providing of the marking, wherein the at least one actuator is further configured to arrange the marking on the object in a circumferentially closed manner or to provide the marking for circumferentially closed arrangement, depending on the control signal of the outputting of the printed product and/or the control signal of the providing of the marking by the printed product output by the printer.

24. The printing system of claim 1, wherein the device further comprises:

an electrical interface configured to supply electrical power to the device via the printer.

25. The printing system of claim 1, wherein the material interface is configured relative to the mechanical interface to receive, in the mounted state, the printed material output by the printer, and/or wherein the data interface is configured relative to the mechanical interface to contact the printer for communication in the mounted state, and/or wherein the electrical interface is configured relative to the mechanical interface to contact, in the mounted state, the printer for supplying electrical energy to the device.

26. The printing system of claim 1, wherein the prolate object comprises a conductor.

27. The printing system of claim 1, wherein the force-locking is magnetic.

* * * * *